(12) United States Patent
Boeselager et al.

(10) Patent No.: US 10,977,461 B1
(45) Date of Patent: Apr. 13, 2021

(54) BARCODE BOOKLET

(71) Applicant: AMB Media LLC, Chattanooga, TN (US)

(72) Inventors: Adam Michael Boeselager, Lookout Mountain, TN (US); Nicholas James Macco, Chattanooga, TN (US)

(73) Assignee: AMB Media LLC, Chattanooga, TN (US)

( * ) Notice: Subject to any disclaimer, the term of this patent is extended or adjusted under 35 U.S.C. 154(b) by 0 days.

(21) Appl. No.: 16/849,611

(22) Filed: Apr. 15, 2020

(51) Int. Cl.
| | |
|---|---|
| *G02B 26/00* | (2006.01) |
| *G06K 7/10* | (2006.01) |
| *G06K 19/06* | (2006.01) |
| *G06K 1/12* | (2006.01) |
| *G06K 7/14* | (2006.01) |

(52) U.S. Cl.
CPC ......... *G06K 7/10722* (2013.01); *G06K 1/121* (2013.01); *G06K 7/10564* (2013.01); *G06K 7/1413* (2013.01); *G06K 19/06028* (2013.01)

(58) Field of Classification Search
CPC .... G06K 9/228; G06K 2209/01; G06Q 30/00; H04N 1/107
USPC .................. 235/487, 462.01, 462.09, 462.41
See application file for complete search history.

(56) References Cited

U.S. PATENT DOCUMENTS

| | | | | |
|---|---|---|---|---|
| 5,613,349 A * | 3/1997 | Brown | ..................... | B65B 11/50 53/411 |
| 5,640,447 A * | 6/1997 | Fonseca | ............... | G06Q 20/342 235/380 |
| 8,147,643 B1 * | 4/2012 | Valenti, Jr. | ................ | B41F 5/24 156/258 |
| 2008/0236733 A1 * | 10/2008 | Hudetz | ..................... | B42C 1/10 156/252 |
| 2009/0032578 A1 * | 2/2009 | Spector | .................. | G06Q 30/02 235/375 |
| 2009/0072952 A1 * | 3/2009 | Niiyama | ................ | G06K 17/00 340/10.51 |
| 2009/0307951 A1 * | 12/2009 | Lund | ..................... | G09F 3/0289 40/638 |

OTHER PUBLICATIONS

AMB Media LLC, "Barcode Your Items," published at least as early as Oct. 1, 2014.

(Continued)

*Primary Examiner* — Daniel St Cyr
(74) *Attorney, Agent, or Firm* — Waller Lansden Dortch & Davis, LLP; Matthew C. Cox

(57) ABSTRACT

A booklet may include multiple customized booklet pages. The booklet pages may include including a barcode page that may include multiple barcode labels that can be selectably disposed on physical media items. The booklet pages may include pages with instructions, upgrade labels, shipping labels, or other information. The booklet pages may be customized to a customer digitization order. A system with a barcode scanner, physical media item converter, and a computing device may scan the barcode labels of the physical media items, read the content stored on the physical media items, convert the content to a digital format, and associate the digitally formatted content with the corresponding barcode label. The system may allow a customer to access the content in the digital format, such as a DVD, digital download, or a thumb drive.

8 Claims, 25 Drawing Sheets

(56) References Cited

OTHER PUBLICATIONS

AMB Media LLC, "Welcome," published Dec. 2013.
AMB Media LLC, "The Legacybox Memory Preservation Kit," published at least as early as Dec. 2013, Kickstarter, www.kickstarter.com/projects/southtree/the-legacybox-memory-preservation-kit/.

* cited by examiner

650

The nearest shipping drop-off locations to you are:

450 Church Street
Suite 30
Smalltown, TN 34568  ← 606(1)

4303 Green Hill Ave.
Smalltown, TN 34568
(drop off box located
around back)  ← 606(2)

230 Main Street
Neighborville, TN 35411  ← 606(3)

| Order ID | Media ID | File ID |
|---|---|---|
| 933559 | 933559-01 | 933559-01.jpg |
| 933560 | 933560-01 | 933560-01.mp3 |
| 933560 | 933560-02 | 933560-02.mp4 |
| 933561 | 933561-01 | |
| 933561 | 933561-02 | |
| 933561 | 933561-03 | |
| 933562 | 933562-01 | |
| 933563 | 933563-01 | |

| Media ID | File ID |
|---|---|
| 933563-01 | 933563-01.mp3 |
| 933563-02 | 933563-02.mp4 |
| 933563-03 | 933563-03.mp4 |
| 933563-04 | 933563-04.jpg |
|  | 933563-05.jpg |
|  | 933563-06.jpg |
|  | 933563-07.jpg |
| 933563-05 | 933563-08.mp3 |
| 933563-06 | 933563-09.mp4 |

| Media ID | File ID |
|---|---|
| 933563-01 | 933563-01.mp3 |
| 933563-02 | 933563-02.mp4 |
| 933563-03 | 933563-03.mp4 |
| 933563-04 | 933563-04-01.jpg |
|  | 933563-04-02.jpg |
|  | 933563-04-03.jpg |
|  | 933563-04-04.jpg |
| 933563-05 | 933563-05.mp3 |
| 933563-06 | 933563-06.mp4 |

FIG. 10B

BARCODE BOOKLET

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE DISCLOSURE

The present disclosure generally relates to booklets, and more particularly to a barcode booklet.

Physical media items, such as photographic prints or videotape cassettes, deteriorate over time, causing the content stored on these items to be lost or at least reduced in quality. Digitizing the content stored by these physical media items is important for preserving the content. However, digitizing multiple items introduces its own problems and shortcomings, because items can be mixed up, accidently digitized multiple times, or accidently not digitized at all.

What is needed then are improvements related to barcode booklets.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure may include a booklet. The booklet may include a plurality of booklet pages. The plurality of booklet pages may include a multi-layer page. The multi-layer page may include a label. The label may include a front side and a back side. The back side may be disposed opposite the front side. The back side may include an adhesive. The multi-layer page may include a backing layer. The back side of the label may be selectably adhered to the backing layer with the adhesive. The booklet may include a single-layer page. The booklet may include a binding that joins the plurality of booklet pages. The booklet may include a plurality of barcodes. The multi-layer page may include a barcode page. A label of the barcode page may include a plurality of labels, and each label of the plurality of labels may include a barcode of the plurality of barcodes disposed on the front side of the label. Each barcode of the plurality of barcodes may be unique among the plurality of barcodes.

Another aspect of the disclosure may include a system. The system may include a printer, a barcode scanner, or a physical media item converter. The system may include a computing device. The computing device may include a processor. The computing device may include a computer-readable storage medium. the computer readable storage medium may include a plurality of computer-executable instructions. The computer-executable instructions, when executed by the processor, may cause the processor to generate a plurality of barcodes, send the plurality of barcodes to the printer, receive, from the barcode scanner, a physical media item identifier corresponding to a barcode of the plurality of barcodes, receive, from the physical media item converter, the content stored on a physical media item, convert the received content to a digital format, store the digitally formatted content in a file on the computer-readable storage medium, or store, in a database entry of a database, the physical media item identifier and the file identifier.

Another aspect of the disclosure may include a method. The method may include a method of converting physical media to digital media. The method may include generating a database entry in a database. The database entry may include a physical media item identifier. The method may include obtaining a package from a customer. The package may include a physical media item. The method may include scanning, via a barcode scanner, a barcode disposed on a label adhered to the physical media item. The barcode may correspond to the physical media item identifier of the database entry. The method may include converting, via a physical media item converter, content stored on the physical media item to a digital format. The method may include storing the digitally formatted content in a computer-readable storage medium. The method may include storing, as a file identifier in the database entry, a file identifier corresponding to the digitally formatted content. The method may include shipping a second package to the customer. The second package may include the physical media item. The method may include allowing the customer access to the digitally formatted content.

Another aspect of the disclosure may include another method. The method may include a method of adding value to an item. The method may include printing a booklet. The booklet may include one or more labels. Each label of the one or more labels may include a barcode. The method may include disposing the booklet in a first package. The method may include shipping the first package to a customer. The method may include receiving a second package from the customer. The second package may include one or more items. Each item of the one or more items may include a label of the one or more labels of the first package disposed on the item. The method may include improving each of the one or more items of the second package. The method may include disposing each improved item of the one or more improved items in a third package. The method may include shipping the third package to the customer.

Numerous other objects, advantages and features of the present disclosure will be readily apparent to those of skill in the art upon a review of the following drawings and description of various embodiments.

BRIEF DESCRIPTION OF THE DRAWINGS

FIG. 6B is a front view illustrating one embodiment of a shipping locations page of the booklet.

FIG. 9 is a schematic block diagram illustrating one embodiment of a portion of a database.

FIG. 10A is a schematic block diagram illustrating one embodiment of a physical media item-file index.

FIG. 10B is a schematic block diagram illustrating another embodiment of the physical media item-file index.

DETAILED DESCRIPTION

Figure 1A:
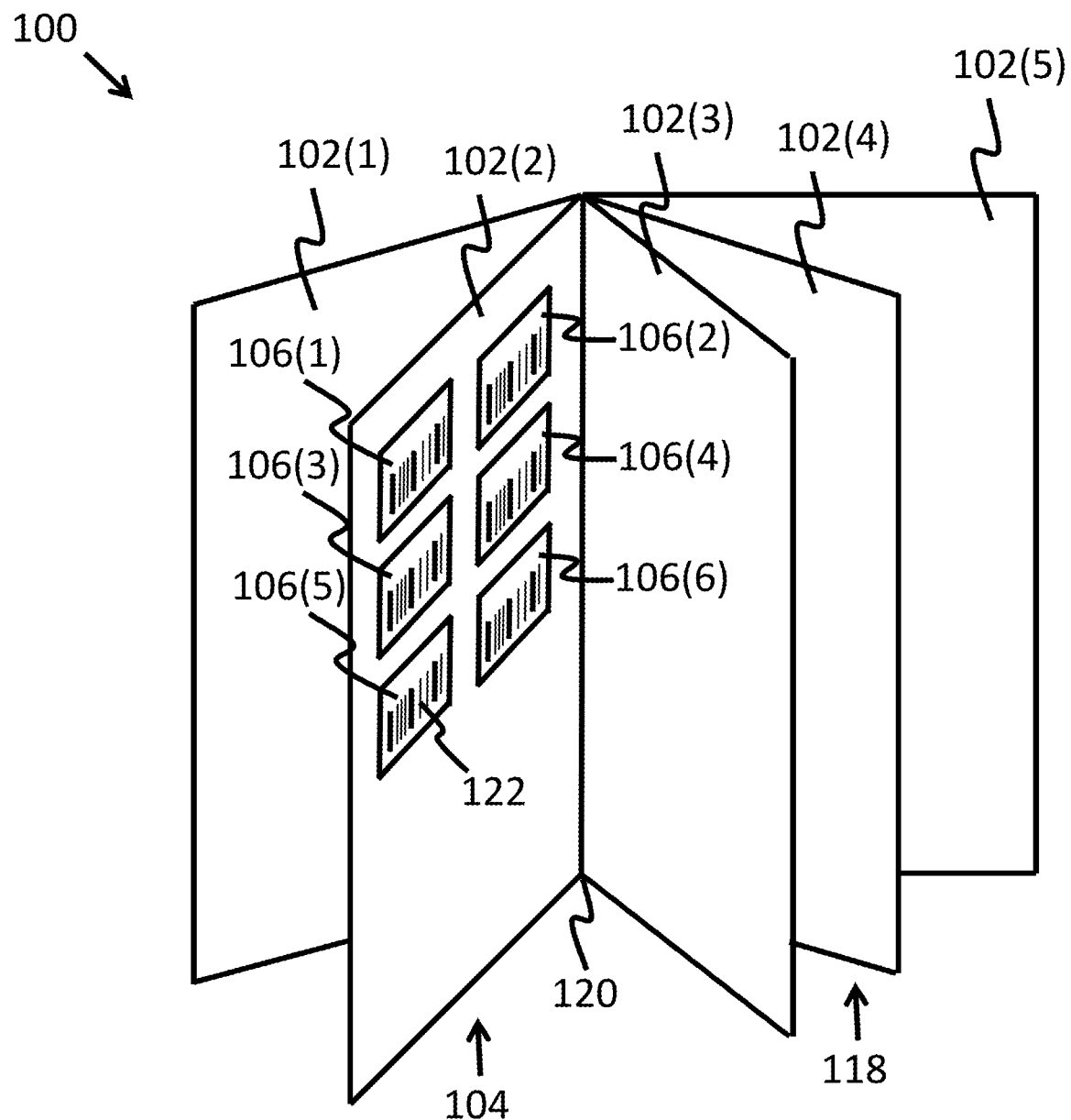
FIG. 1A is a perspective view illustrating one embodiment of a booklet.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatus and methods described herein. Such equivalents are considered to be within the scope of this disclosure and are covered by the claims.

As used herein, the term "a" means "at least one" or "one or more." Thus, "a label" may refer to a single label or to multiple labels. The term "or" means "and/or" unless explicitly stated otherwise.

As used herein, the term "barcode" includes the actual barcode itself (i.e., the pattern that can be read by an optical scanner). The term "barcode data" includes the data encoded by a corresponding barcode. Furthermore, the term "barcode" includes linear barcodes, matrix codes, two-dimensional barcodes (such as quick response (QR) codes), or other types of optical encoding codes that can be read by an optical scanner.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

In one embodiment, the disclosure relates to a booklet. The booklet may include a booklet related to digitizing and preserving content stored on physical media items, such as videocassettes, tape cassettes, or photographic prints. The booklet may include labels that can be removed from the booklet and selectably disposed on a physical media item. The label may include a barcode. The barcode may be scannable. The content of the physical media item can be read or scanned and converted into a digital format.

A customer may place a digitization order to digitize one or more physical media items. A computer system may receive the digitization order and cause the booklet to be printed based on the digitization order. The booklet may be sent in a package to the customer. The customer may dispose labels found in the booklet on his/her physical media items and ship the package with the labelled physical media items back. The computer system may use a barcode scanner to scan the barcodes of the labels and may use other equipment to digitize the content stored on the physical media items. The computer system may store the digitized content in a file on the computer system's storage and associate the digitized content with an identifier corresponding to the scanned barcode. The file that includes the digitized content may be made accessible to the customer, for example, via downloadable link or by sending a storage disk (such as a compact disk (CD) or digital video disk (DVD)) or a thumb drive to the customer.

Figure 1B:
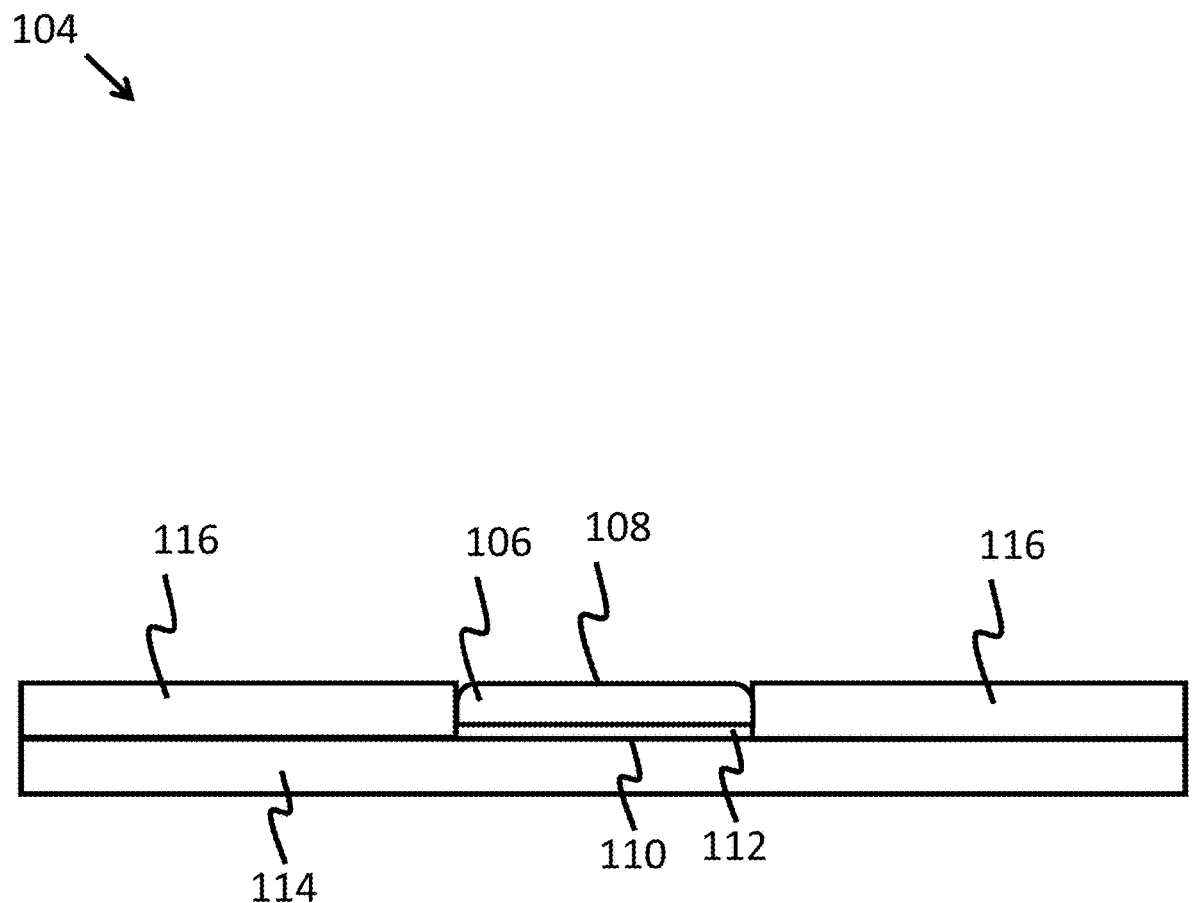
FIG. 1B is a cutaway side view illustrating one embodiment of a multi-layer page of the booklet.

FIG. 1A depicts one embodiment of a booklet 100. The booklet 100 may include a plurality of booklet pages 102. For example, as depicted in FIG. 1A, the booklet 100 may include the booklet pages 102(1)-(5). In some embodiments, the booklet pages 102 may include a first multi-layer page 104. FIG. 1B depicts a cutaway side view of one embodiment of a multi-layer page 104. The multi-layer page 104 may include a label 106. The label 106 may include a front side 108. The label 106 may include a back side 110. The back side 110 may be disposed opposite the front side 108. The back side 110 may include an adhesive 112. The multi-layer page 104 may include a backing layer 114. The back side 110 of the label 106 may be selectably disposed on the backing layer 114. For example, the back side 110 of the label 106 may be selectably adhered to the backing layer 114 with the adhesive 114. In some embodiments, the multi-layer page 104 may include a surrounding layer 122. The surrounding layer 122 may be disposed on the backing layer 114. The surrounding layer 122 may not be removable from the backing layer 114. The surrounding layer 122 may surround at least a portion of the sides of the label 106 when viewing the front of the label 106.

In some embodiments, a label 106 may be selectably removable from the backing layer 114. The label 106 may be selectably adhereable to a physical media item. A physical media item may include an item capable of holding media content in an analog or digital format. Media content may include video content, audio content, image content, text content, or other content perceptible by a person. A physical media item may include a tape cassette. A tape cassette may include a video home system (VHS) videocassette, a VHS-compact (VHS-C) videocassette, a MiniDV videocassette, a high-band Video8 (Hi8) videocassette, an 8 mm videocassette, a Digital8 videocassette, a MicroMV videocassette, a Betamax videocassette, or some other type of videocassette. A tape cassette may include an analog magnetic tape or other type of audio tape cassette. A physical media item may include a film reel. A physical media item may include an image item (e.g., a photographic print, a film negative, a photographic slide) or a bundle that includes one or more image items. The bundle may include an envelope, a re-sealable zipper storage bag, a rubber band, or some other bundling apparatus. A physical media item may include a computer storage item. A computer storage item may include a CD, a DVD, a hard drive, or a disk insertable into a disk drive, such as a floppy disk or a Zip disk. In some embodiments, a physical media item may include a cellphone, a camcorder, a voice recording device (such as a digital voice recorder), a personal digital assistant (PDA), a video game device (e.g., a portable gaming device or a video game console), or some other device. A physical media item may include a device with an internal or flash memory (such as a cellphone, voice recorder, or other type of device).

Returning to FIG. 1A, the plurality of booklet pages 102 may include a single-layer page 118. The single-layer page 118 may include a single layer or a single sheet instead of multiple layers (e.g., the surrounding layer 116 and the label 106 as one layer, and the backing layer 114 as another layer). The booklet 100 may include a binding 120. The binding 120 may join the plurality of booklet pages 102. The booklet 100 may include a plurality of barcodes 122. A first multi-layer page 104 may include a barcode page (for example, the barcode page 400 shown in FIG. 4B, below). The label 106 of the barcode page may include multiple labels 106 (for example, the labels 106(1)-(6) shown in FIG. 1A). Each label 106 of the plurality of labels 106 may include a barcode 122 of the plurality of barcodes 122. The barcode 122 may be disposed on the front side 108 of the label 106. Each barcode 122 of the plurality of barcodes 122 may be unique among the multiple barcodes 122.

In one embodiment, the booklet 100 may be included in a package. The package may be sent to a customer in response to the customer placing a digitization order. The customer may place the customer digitization order in response to wanting to have one or more of his/her physical media items digitized. The package may include a box and the booklet 100 disposed inside the box.

Figure 2:
FIG. 2 is a front view illustrating one embodiment of a single-layer page of the booklet.

FIG. 2 depicts one embodiment of a single-layer page 118 of the booklet 100. In one embodiment, a single-layer page 118 may be customized based on the customer or the customer digitization order. The single-layer page 118 may include printed information 202. The printed information 202 may be customized to the customer or the customer digitization order. The printed information 202 may include printed text. For example, the printed information 202 may include the customer's name, which a computer system that caused the printing of the booklet 100 may have obtained from a database. The printed information 202 may include the physical media item types that the customer indicated in the customer digitization order that the customer would be sending in to be digitized. In some embodiments, the printed information 202 may be printed on a multi-layer page 104.

Figure 3:
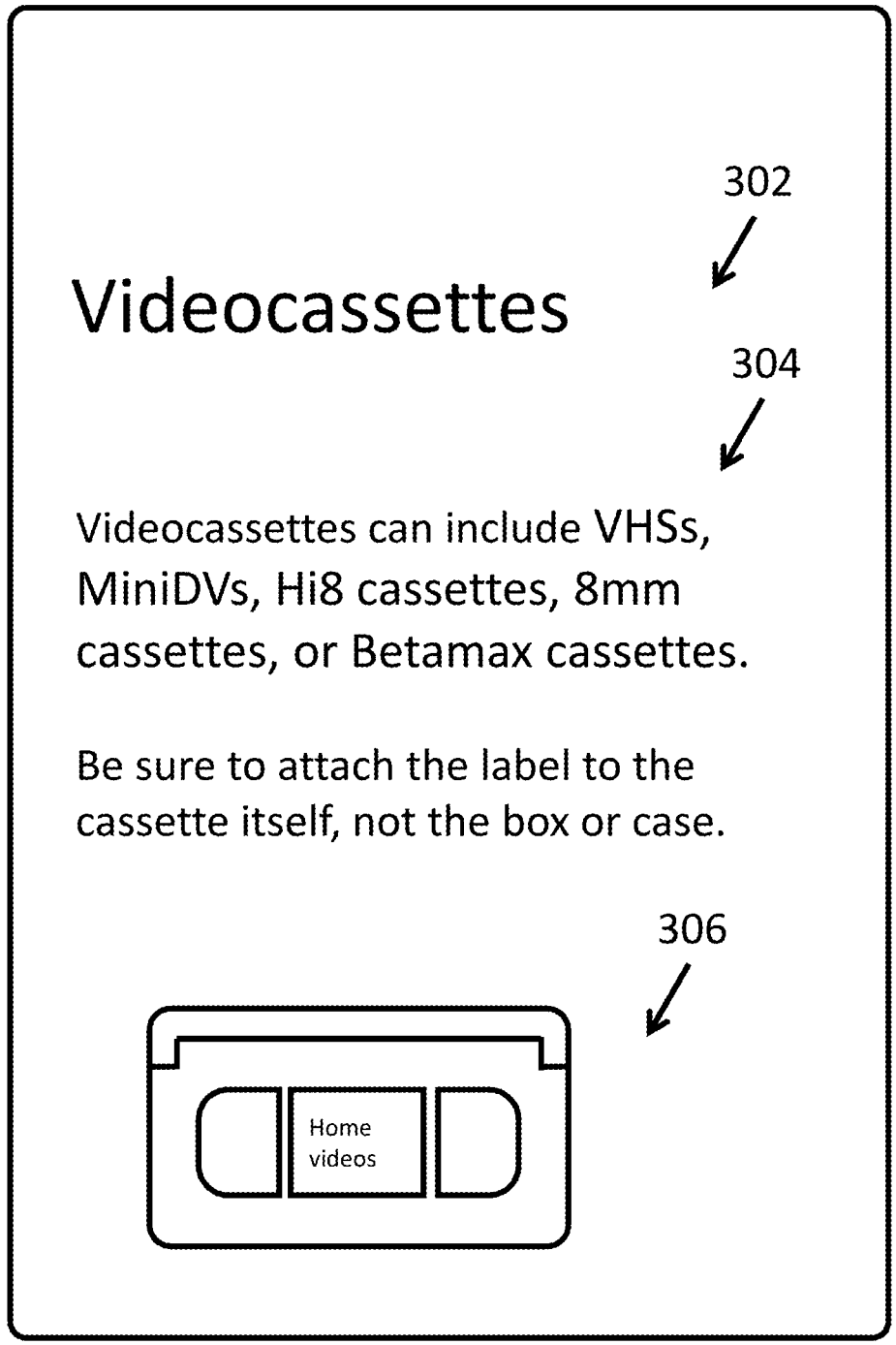
FIG. 3 is a front view illustrating another embodiment of a single-layer page.

FIG. 3 depicts an embodiment of another portion of the booklet 100. In some embodiments, the plurality of booklet pages 102 may include a second single-layer page 118. The second single-layer page 118 may include printed information 302. The printed information 302 may include printed text that includes information about a type of physical media item. The printed information 302 may include text 304 describing the type of physical media item, how to apply a label 106 to the physical media item, or may include other information. The printed information 302 may include images 306 of the physical media item, an image of a label 106 disposed on a physical media item, or other images. In one embodiment, multiple single-layer pages 118 may each include printed information 302 about different types of physical media items.

Figure 4A:
FIG. 4A is a front view illustrating one embodiment of a physical media item label.

FIG. 4A depicts one embodiment of a physical media item label 402. In some embodiments, a label 106 may include a physical media item label 402. The label may include price information 404. The price information 404 may indicate how much the customer will be charged for converting the physical media item with that physical media item label 402 attached to it. The physical media item label 402 may include a barcode 122. The physical media item label 402 may include identifier information 406. The identifier information 406 may include the barcode data that corresponds to the barcode 122 of the physical media item label 402. The identifier information 406 may include some other printed information that may identify the physical media item label 402 or the physical media item that the physical media item label 402 is disposed on. The identifier information 406 may uniquely identify the physical media item label 402. In some embodiments, the physical media item label 402 may include physical media item information (not shown in FIG. 4A). The physical media item information may include text identifying the type of physical media item the physical media item label 402 may be disposed on (e.g., a film reel or a bundle of photographic prints).

Figure 4B:
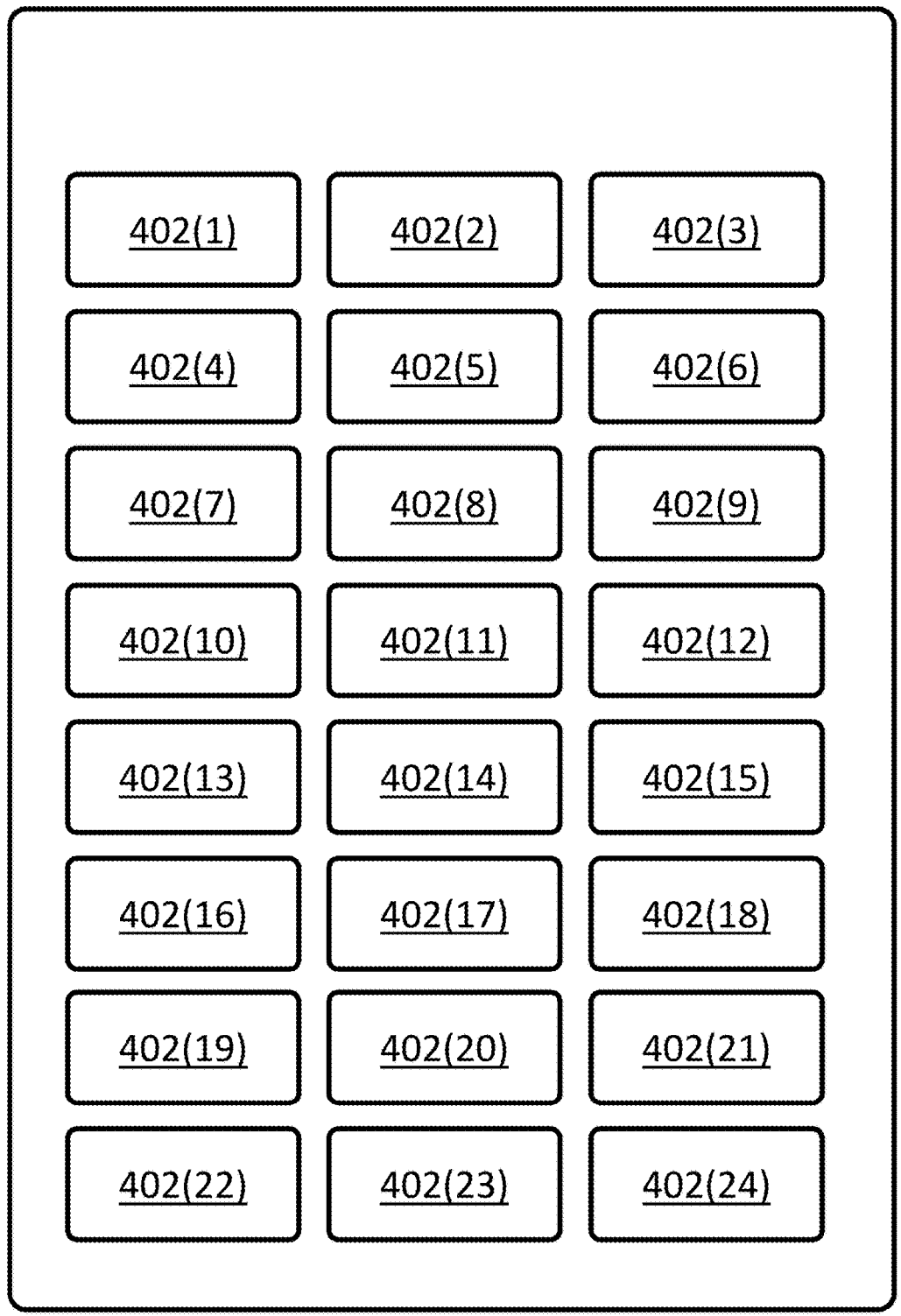
FIG. 4B is a front view illustrating one embodiment of a barcode page of the booklet.

FIG. 4B depicts one embodiment of a barcode page 400. In one embodiment, a multi-layer page 104 may include the barcode page 400. The barcode page 400 may include multiple labels 106. Each label 106 of the multiple labels 106 may include a barcode 122 of the plurality of barcodes 122 disposed on the front side 108 of the label 106. Each barcode 122 of the plurality of barcodes 122 may be unique among the plurality of barcodes 122.

For example, the barcode page 400 shown in FIG. 4B may include 24 physical media item labels 402. Each physical media item label 402 may include a barcode 122 of the plurality of barcodes 122 disposed on the front side 108 of the label 106, and each barcode 122 of the plurality of barcodes 122 may be unique among the multiple barcodes 122. In some embodiments, each barcode 122 may be unique among all barcodes produced by a computer system that generates or prints the barcodes. In some embodiments, the booklet 100 may include multiple barcode pages 400. For example, the barcode 122 of the physical media item label 402(1) may correspond to the barcode data "933561-01," the barcode 122 of the physical media item label 402(2) may correspond to the barcode data "933561-02," the barcode 122 of the physical media item label 402(3) may correspond to the barcode data "933561-03," etc. The identifier information 406 of each physical media item label 402 of the barcode page 400 may include the barcode data printed on the physical media item label 402.

Figure 4C:
FIG. 4C is a front view illustrating one embodiment of an upgrade physical media item label.

FIG. 4C depicts one embodiment of an upgrade physical media item label 408. A label 106 may include an upgrade physical media item label 408. The upgrade physical media item label 408 may include similar elements to the physical media item label 402 of FIG. 4A, such a price information 404, a barcode 122, and identifier information 406. Like the physical media item label 402, the upgrade physical media item label 408 may be disposable on a physical media item. The booklet 100 may include one or more of the these upgrade physical media item labels 408 in case the customer realizes that he/she has more physical media items that he/she wants to add to the digitization order without having to submit an additional digitization order.

Figure 4D:
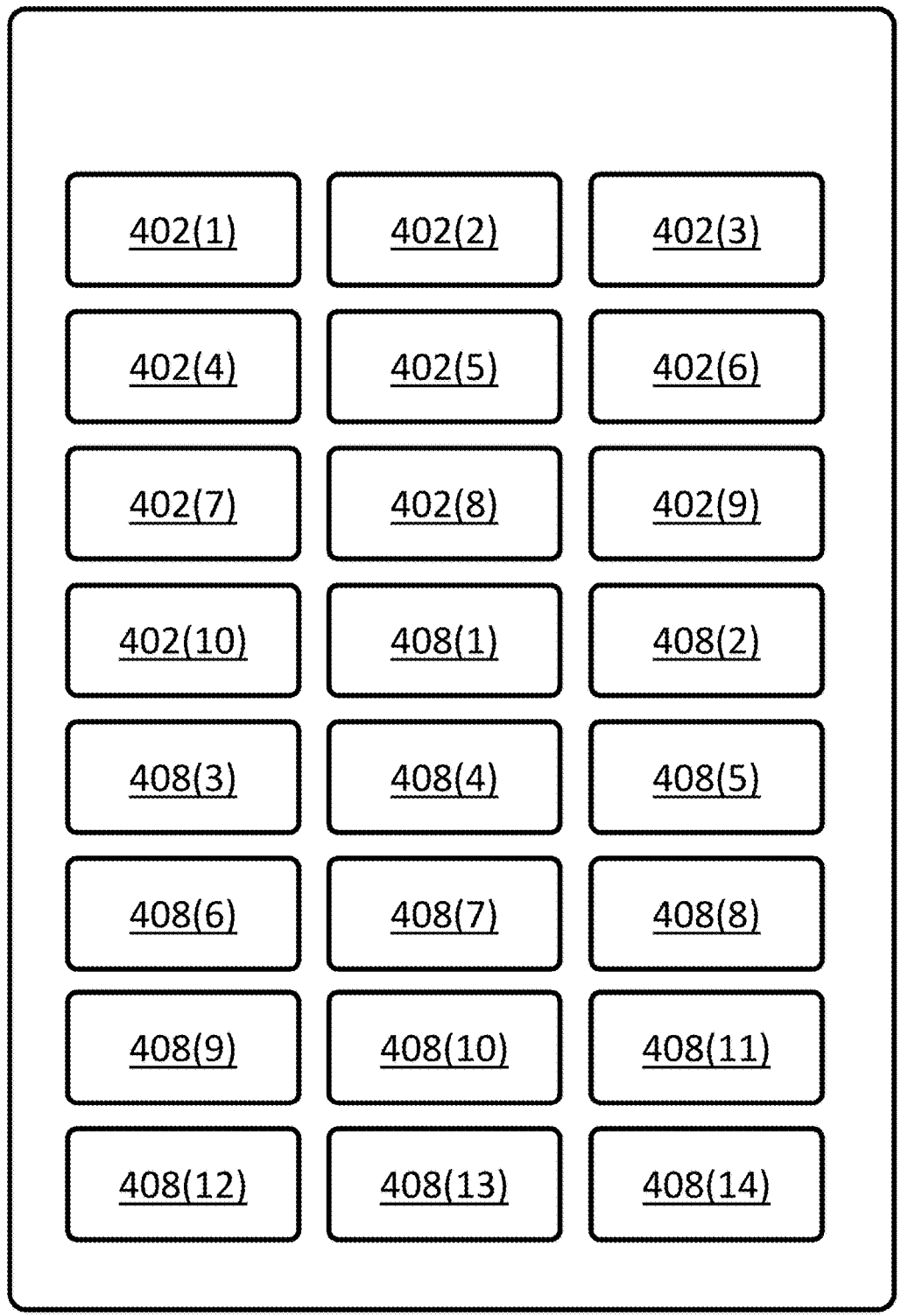
FIG. 4D is a front view illustrating another embodiment of the barcode page of the booklet.

FIG. 4D depicts another embodiment of the barcode page 400. As can be seen in FIG. 4D, the barcode page 400 may include one or more physical media item labels 402 and one or more upgrade physical media item labels 408. The number of physical media item labels 402 and upgrade physical media item labels 408 may be customized to the customer digitization order that corresponds to the booklet 100. For example, if a customer digitization order is for 10 items to be digitized, then the barcode page 400 may include 10 physical media item labels 402, and the remainder of the labels 106 on the barcode page 400 may include upgrade physical media item labels 408. In another example, if a customer digitization order is for 24 items to be digitized, then the barcode page 400 may include 24 physical media item labels 402 and no upgrade physical media item labels 408.

Figure 4E:
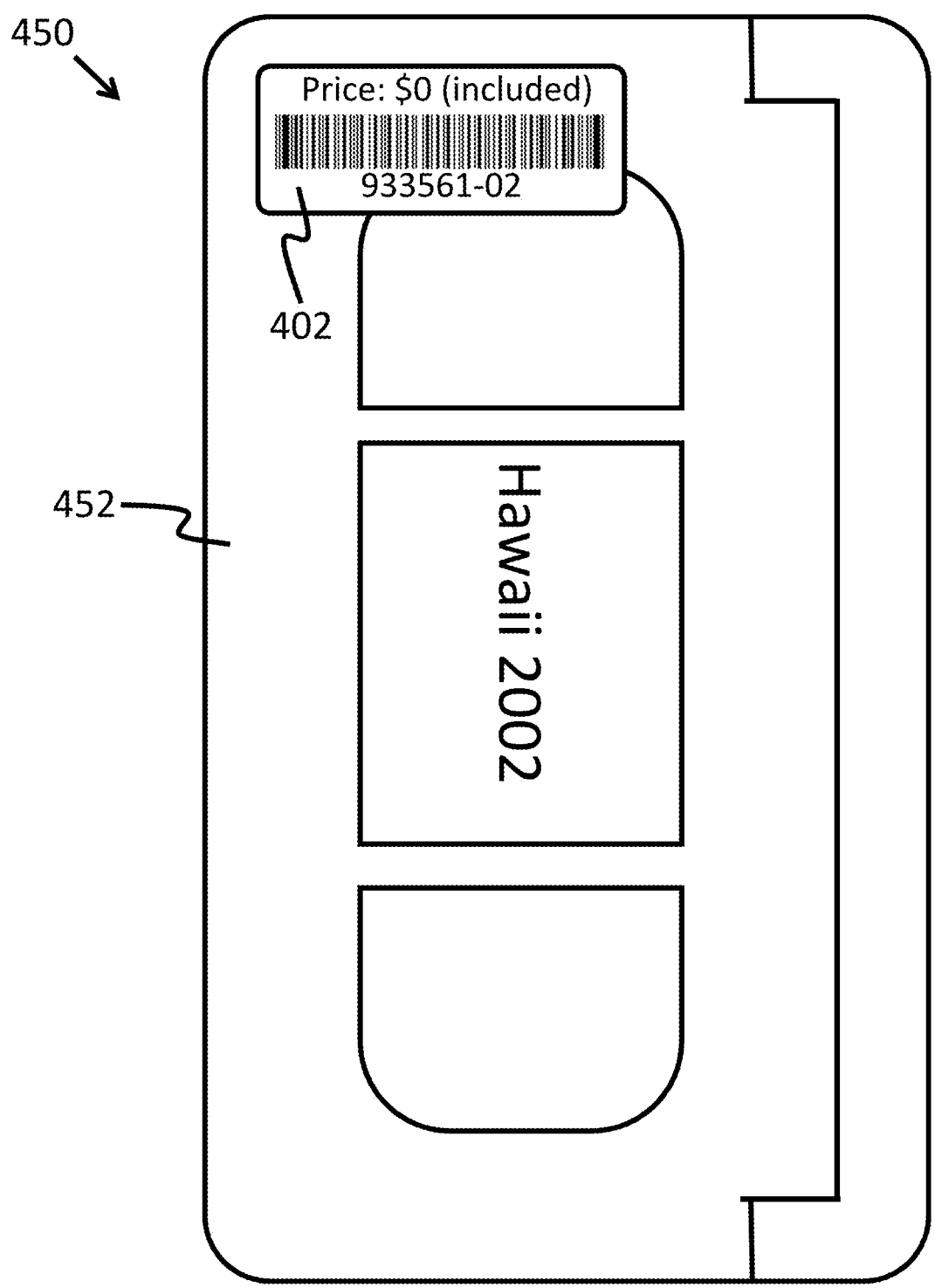
FIG. 4E is a front view illustrating one embodiment of a physical media item with a physical media item label disposed thereon.

FIG. 4E depicts one embodiment of a system 450 for a physical media item. The system 450 may include a physical media item 452. For example, the physical media item 452 of FIG. 4E may include a videocassette. The system 450 may include a label 106. For example, as shown in FIG. 4E, the physical media item 452 may have a physical media item label 402 disposed on it. In this manner, the barcode 122 of the physical media item label 402 physical media item 452 can be scanned and the contents of the physical media item 452 can be associated with the barcode data of the scanned barcode 122 of the physical media item label 402, as explained below.

Figure 4F:
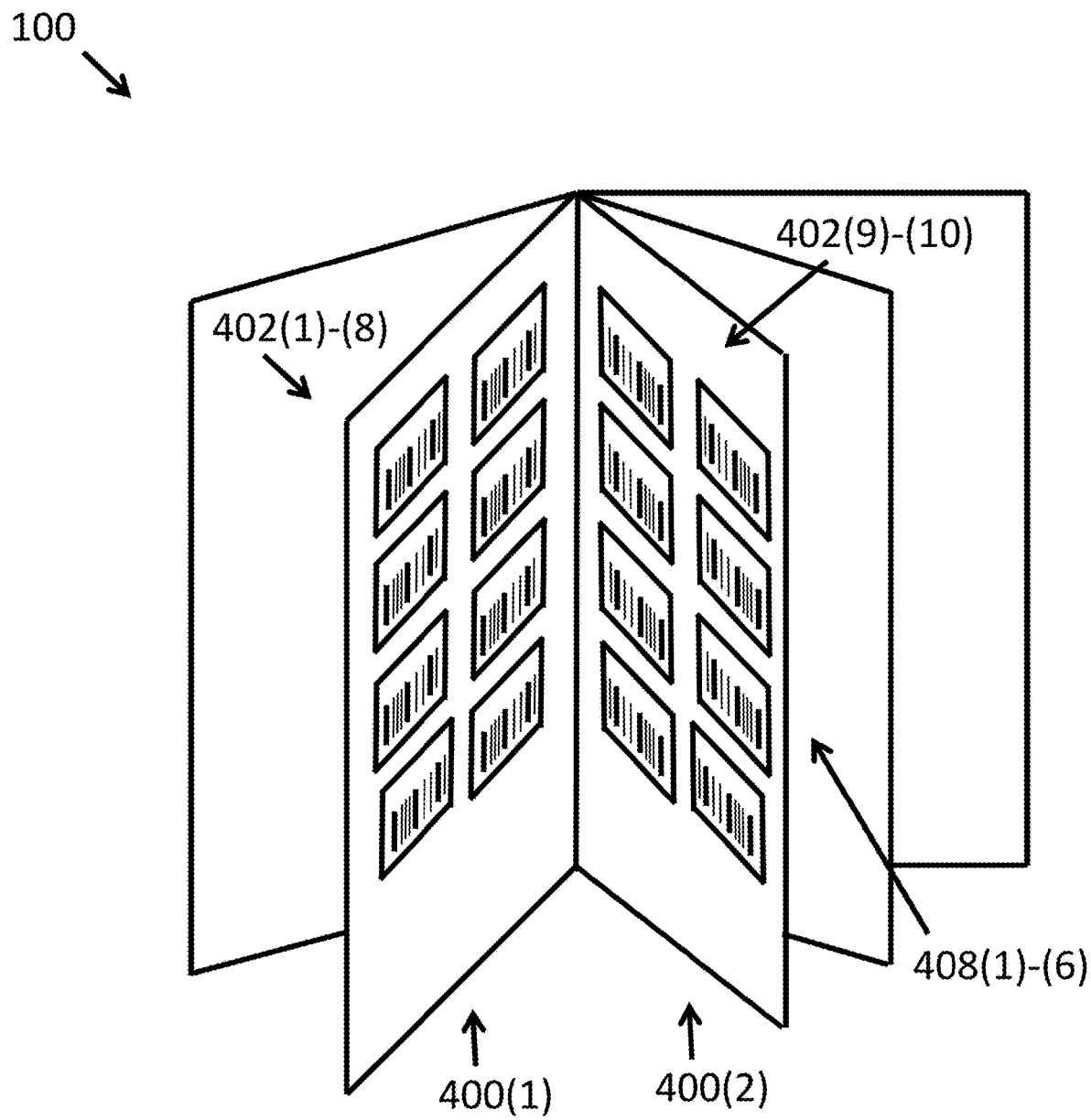
FIG. 4F is a perspective view illustrating one embodiment of a booklet with multiple barcode pages.

FIG. 4F depicts one embodiment of the booklet 100. The booklet 100 may include multiple barcode pages 400. For example, as depicted in FIG. 4F, the booklet may include a first barcode page 400(1) and a second barcode page 400(2). The first barcode page 400(1) may include a subset of the physical media item labels 402 or upgrade physical media item labels 408, and the second barcode page 400(2) may include another subset of the physical media item labels 402 or upgrade physical media item labels 408. For example, as shown in FIG. 4F, the first barcode page 400(1) may include the first 8 physical media item labels 402(1)-(8), and the second barcode page 400(2) may include the last two physical media item labels 402(9)-(10) and several upgrade physical media item labels 408(1)-(6).

In some embodiments, the number of barcode pages 400 the booklet 100 includes may be customized based on the customer digitization order data. For example, a booklet 100 generated and printed based on a customer digitization order where the order includes only 10 physical media items may include only one barcode page 400 (e.g., the barcode page 400 of either FIG. 4B or FIG. 4D). A booklet 100 generated and printed based on a larger customer digitization order (e.g., an order where the order includes 30 physical media items to be digitized) may include two barcode pages 400.

Figure 5A:
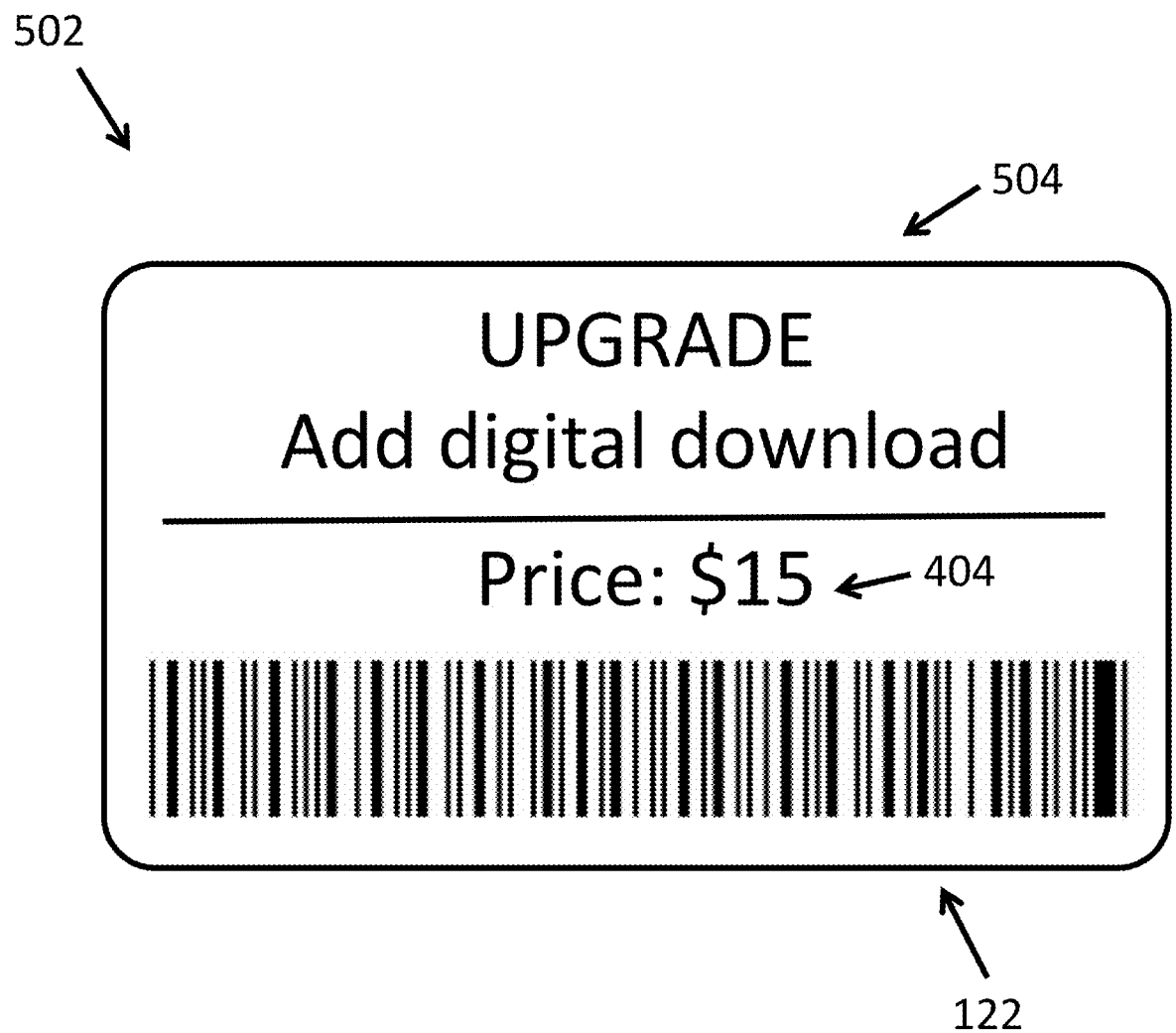
FIG. 5A is a front view illustrating one embodiment of a format upgrade label.

FIG. 5A depicts one embodiment of a format upgrade label 502. A label 106 may include a format upgrade label 502. A format upgrade label 502 may include upgrade information 504. The upgrade information 504 may include an explanation about how attaching the format upgrade label 502 may result in the customer receiving digitized content in a digital format other than the format requested in the customer's original customer digitization order. For example, as depicted in FIG. 5A, the upgrade information 504 may indicate that attaching the format upgrade label 502 may result in the customer receiving the digitized content of his/her customer digitization order via digital download. The format upgrade label 502 may include price information 404. The format upgrade label 502 may include a barcode 122. In one embodiment, the barcode data corresponding to the barcode 122 may indicate the upgraded format (e.g., DVD, thumb drive, digital download). In some embodiments, the format upgrade label 502 may be attached to a physical media item, and only the digitized content corresponding to that physical media item may receive the format upgrade. In other embodiments, attaching the format upgrade label 502 to a physical media item may result in all of the physical media items receiving the format upgrade.

Figure 5B:
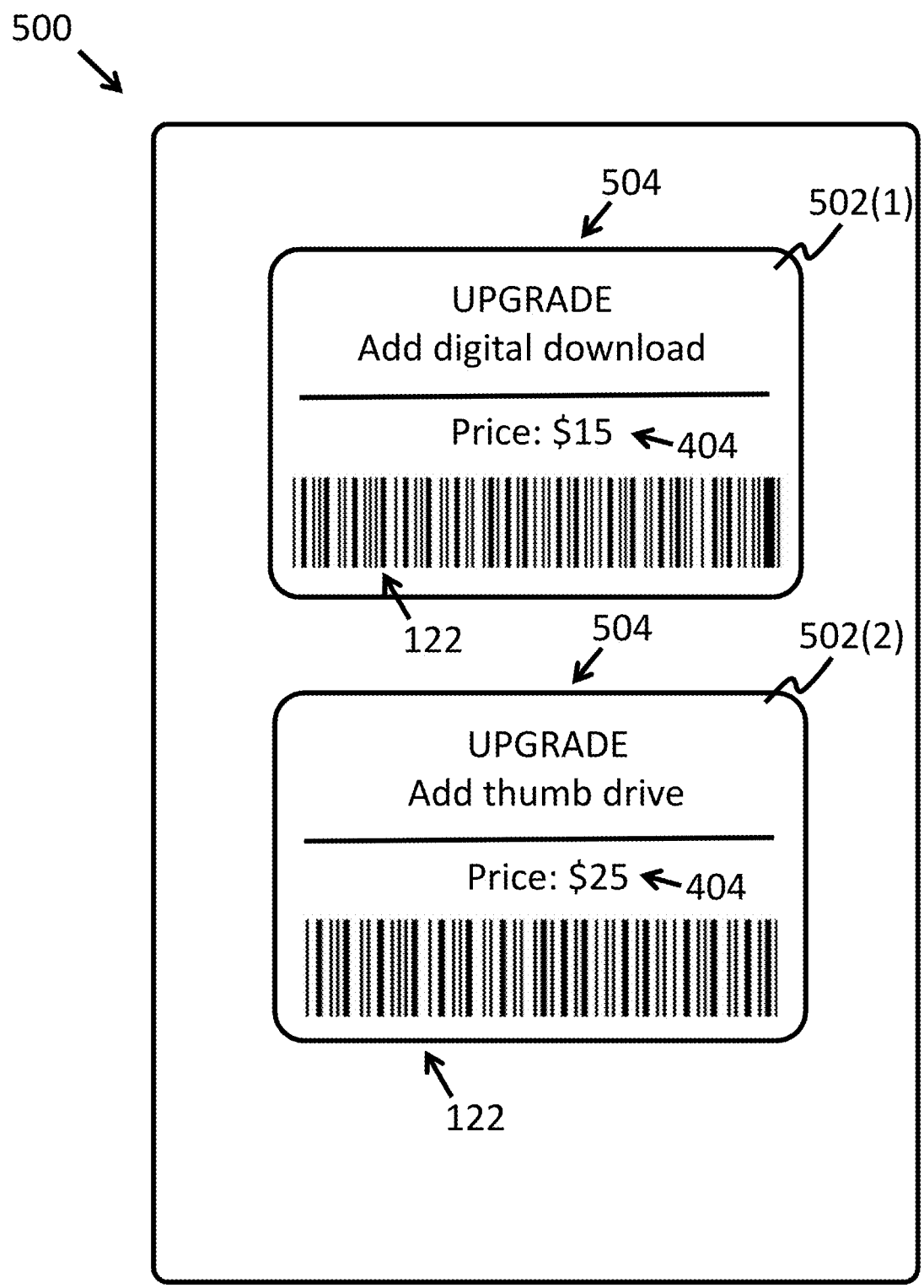
FIG. 5B is a front view illustrating one embodiment of an upgrade page of the booklet.

FIG. 5B depicts one embodiment of an upgrade page 500. In some embodiments, a multi-layer page 104 may include the upgrade page 500. The upgrade page 500 may include elements that may be similar to the barcode page 400. For example, the upgrade page 500 may include one or more labels 106 of the plurality of labels 106. Each label 106 of the plurality of labels 106 of the upgrade page 500 may include a barcode 122 of the plurality of barcodes 122. The barcode 122 may be disposed on the front side 108 of the label 122. A label 106 of the upgrade page 500 may include a format upgrade label 502. The format upgrade label 502 may include the upgrade information 504, the price information 404, and the barcode 122.

In some embodiments, the upgrade information 504 of the format upgrade labels 502 of the upgrade page 500 may be customized based on the customer digitization order. For example, if the customer digitization order includes that the order is to be delivered in a DVD format, then the upgrade page 500 may not include a format upgrade label 502 that corresponds to a DVD format. Instead, as is depicted in FIG. 5B, the upgrade page 500 may include a format upgrade label 502(1) corresponding to a digital download and a format upgrade label 502(2) corresponding to a thumb drive.

Figure 5C:
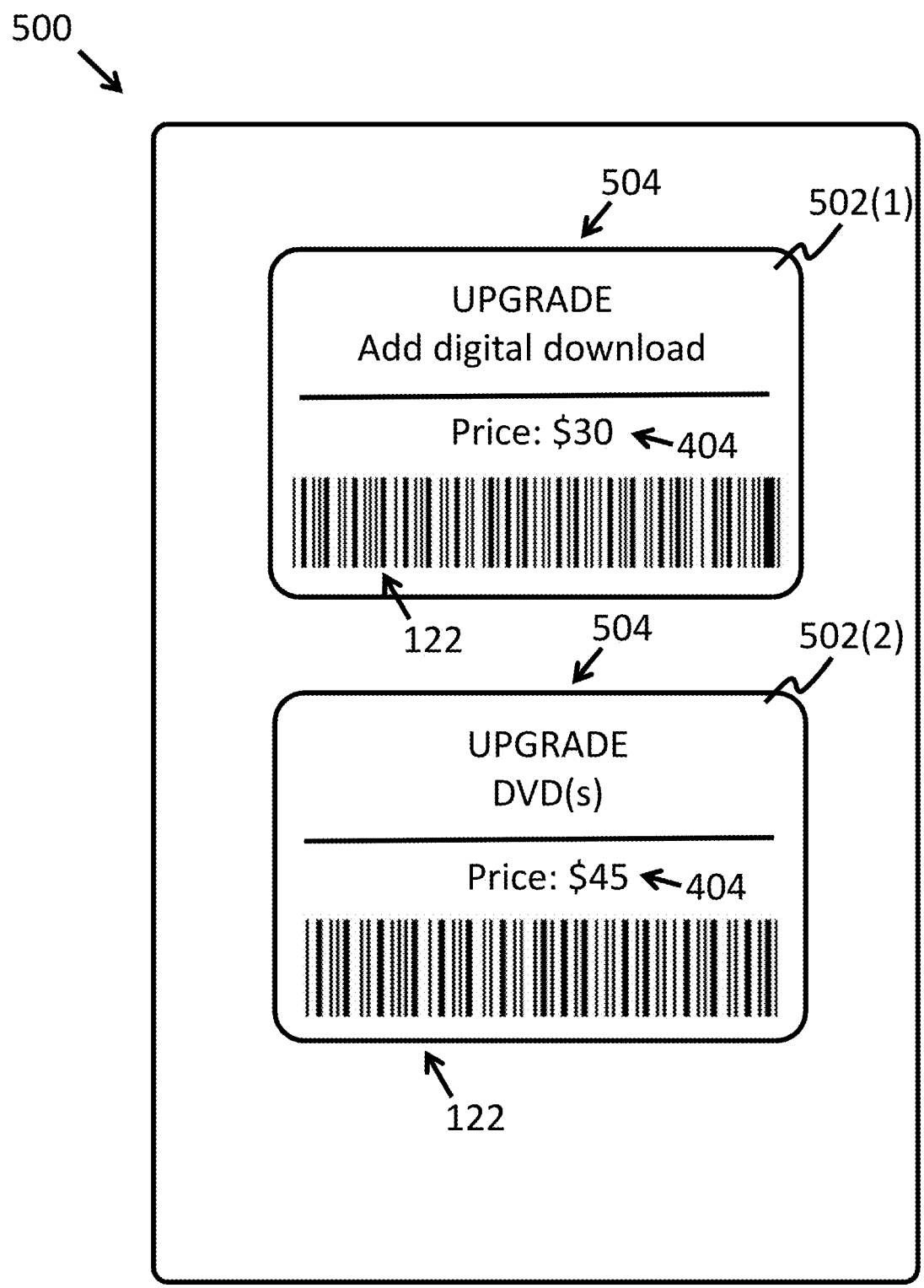
FIG. 5C is a front view illustrating another embodiment of the upgrade page of the booklet.

In one embodiment, the price information 404 of the format upgrade label 502 may be customized based on the number of physical media items of the customer digitization order. In some embodiments, the larger the number of physical media items in the customer digitization order, the higher the price. For example, as depicted in FIG. 5C, the price information 404 of the format upgrade label 502(1) may include a higher price than the price information 404 of the format upgrade label 502(1) depicted in FIG. 5B because the upgrade page 500 of FIG. 5C may be part of a booklet 100 that corresponds to a customer digitization order with more physical media items.

Figure 6A:
FIG. 6A is a front view illustrating one embodiment of a shipping page of the booklet.

FIG. 6A depicts one embodiment of a shipping page 600. A multi-layer page 104 of the plurality of booklet pages 102 of the booklet 100 may include the shipping page 600. The shipping page 600 may include a label 106. The label 106 of the shipping page 600 may include a printed shipping label. The printed shipping label may include shipping information such as a destination address 602, a return address 604, one or more barcodes 122 (e.g., as depicted in FIG. 6A, a linear barcode and a QR code), or other printed information. The destination address 602 may include the address of a location where the customer's physical media items are digitized. The return address 604 may include the customer's address.

FIG. 6B depicts one embodiment of a shipping locations page 650. A single-layer page 118 may include the shipping locations page 650. The shipping locations page 650 may be disposed next to the shipping page 600 in the booklet 100. The shipping locations page 650 may include drop off location information 606. The drop off location information may include information about a location where a customer can drop off a package. The package may include a box with the customer's physical media items inside, each physical media item having one or more labels 106 disposed on it. The package may have the printed shipping label from the shipping page 600 disposed on the package.

In some embodiments, the drop off location information 606 may include an address. The address may be an address of a government post office, an address of a store of a package delivery company, an address where a drop off box for a government postal service or a package delivery company is located, or some other drop off location. The drop off location information 606 may include instructions on locating the office, store, or drop off box.

The shipping locations page 650 may include information about multiple drop off locations. The locations may be customized based on the customer digitization order. For example, the customer digitization order may include data that includes the address of the customer. The drop off locations may be selected and included on the shipping locations page 650 based on proximity to the customer's address. For example, the shipping locations page 650 may include the addresses of the three closest drop off locations to the customer's address.

Figure 7A:
FIG. 7A is a front view illustrating one embodiment of a customer shipping page of the booklet.

FIG. 7A depicts one embodiment of a customer shipping page 700. A multi-layer page 104 of the plurality of booklet pages 102 of the booklet 100 may include the customer shipping page 700. The customer shipping page 700 may include a label 106. The label 106 of the customer shipping page 700 may include a printed shipping label. The printed shipping label may include shipping information such as a destination address 602, a return address 604, one or more barcodes 122, or other printed information. The destination address 602 may include the customer's address. The return address 604 may include the address of the location where the customer's physical media items were digitized.

Figure 7B:
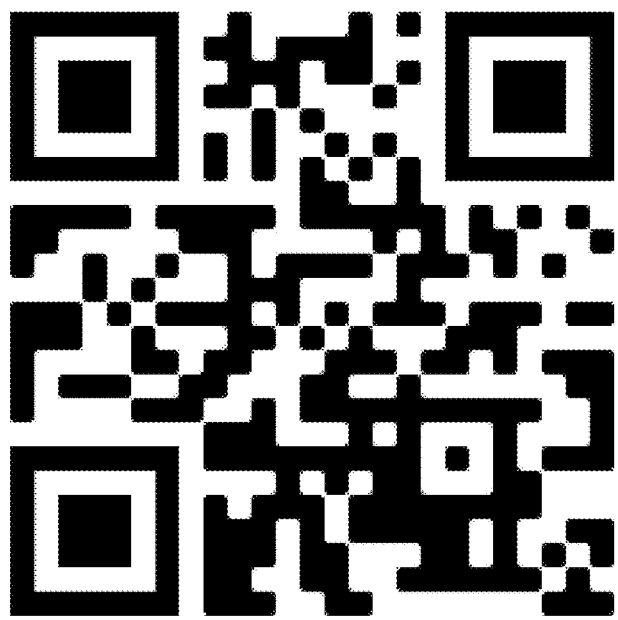
FIG. 7B is a front view illustrating one embodiment of a shipping label-generating page of the booklet.

FIG. 7B depicts one embodiment of a shipping label-generating page 750. The back cover of the booklet 100 may include the shipping label-generating page 750, or a final page of the booklet (which may be a single-layer page 118) or another page of the booklet may include the shipping label-generating page 750. The shipping label-generating page 750 may include a barcode 122. For example, the barcode 122 may include a QR code. A computer system may read the barcode 122 (e.g., via a barcode scanner) and may generate a shipping label based on the barcode 122. The shipping label may include the address of the customer whose customer digitization order caused the generation and printing of the booklet 100. The shipping label 100 may be disposed on a box, the booklet 100 may be disposed inside the box, and the box with the booklet 100 inside may form the first package and be sent to the customer.

In one embodiment, the booklet 100 may include a cover. The cover may include a sheet of material disposed around the other pages of the booklet 100. The cover may include a material different than that multi-layer pages 104 or the single-layer pages 118. The material of the cover may be thicker than the other pages of the booklet 100. The cover may be pre-printed (e.g., the cover may not be customized based on a customer digitization order). The cover may provide a cover for the booklet 100 that may have a more aesthetically pleasing look or feel than the other pages of the booklet 100.

In some embodiments, the binding 114 of the booklet 100 may include one or more fasteners. A fastener may include a staple, spiral binding, one or more rings, or other types of fasteners. In other embodiments, the binding 114 may include an adhesive, a threading, or other types of binding.

Figure 8:
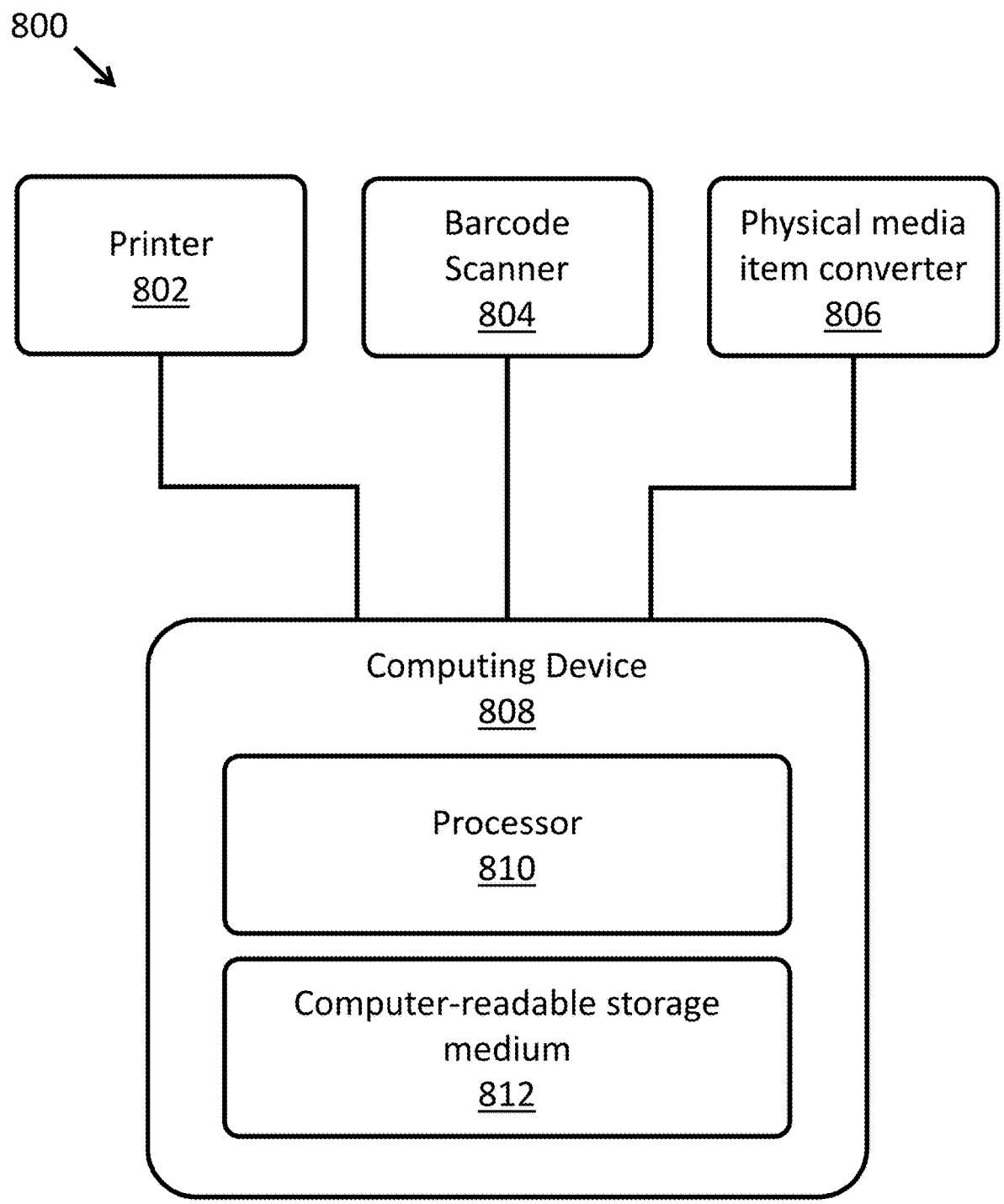
FIG. 8 is a schematic block diagram illustrating one embodiment of a system for converting physical media to digital media.

FIG. 8 depicts one embodiment of a system 800. The system 800 may include a system for converting physical media to digital media. In other words the system 800 may include a system for converting the content stored on a physical media item to a digital format. The system 800 may include a printer 802. The system 800 may include a barcode scanner 804. The system 800 may include a physical media item converter 806. The system 800 may include a computing device 808.

In some embodiments, the computing device 808 may include a processor 810. The computing device 808 may include a computer-readable storage medium 812. The computer-readable storage medium 812 may include one or more computer-executable instructions. The computer-executable instructions, when executed by the processor 810, may cause the processor 810 to perform one or more functions. These functions may include generating a plurality of barcodes 122 and sending the plurality of barcodes 122 to the printer 802. The functions may include receiving, from the barcode scanner 804, a physical media item identifier. The physical media item identifier may correspond to a barcode 122 of the plurality of barcodes 122. The functions may include receiving, from the physical media item converter 806, the content stored on a physical media item, converting the received content to a digital format, and storing the digitally formatted content in a file on the computer-readable storage medium 812. The file stored on the computer may include a file identifier. The functions may include storing, in a database entry of a database, the physical media item identifier and the file identifier.

In one embodiment, the printer 802 may include a peripheral computer hardware device operable to print on sheets of paper or on other print media. The printer 802 may include a personal printer, an industrial printer, a laser printer, an inkjet printer, or some other type of printer. The printer 802 may be operable to print information on sheets that form the plurality of booklet pages 102 of the booklet 100. The printer 802 may print the printed information 202 customized to the customer or customer digitization order or the printed information 302 about types of physical media items. The printer 802 may print the plurality of labels 106 of the barcode page 400, the upgrade page 500, the shipping page 600, or the customer shipping page 700. In some embodiments, some of the printed information 202, 302, or a portion of the information printed on the labels 106 may be pre-printed on the plurality of booklet pages 102, and the printer 802 may print other information on the plurality of booklet pages 102.

The printer 802 may receive data from the computing device 808 and print the plurality of booklet pages 102 based on the received data. The received data may include the specific content of the labels 106, the number of booklet pages 102, the order of the booklet pages 102, or other data. In this manner, the printer 802 is operable to print the booklet 100 customized for the customer's specific digitization order.

In some embodiments, the barcode scanner 804 may include an optical scanner operable to read barcodes and send information based on the scanned barcode to the computing device 808. The barcode scanner 804 may include a laser scanner, light-emitting diode (LED) scanner, a camera-based barcode reader, or another type of barcode scanner. The barcode scanner 804 may read a barcode 122 from a label 106 and send information corresponding to the scanned barcode to the computing device 808.

The physical media item converter 806 may include a device operable to read the content stored on a physical media item and convert the content into an electronic or digital format. The electronic format may include a plurality of signals. The plurality of signals may include the content of the physical media item in a digital format, or the physical media item converter 806 may send the electronic signals to the computing device 808, and the computing device 808 may be operable to convert the plurality of signals into the digital format.

In one embodiment, the physical media item converter 806 may include an image scanner. The image scanner may include a flatbed scanner. The image scanner may be operable to optically scan an image item (e.g., a photographic print or a film negative) and generate the plurality of signals based on the image item. The image scanner may be operable to convert the electrical signals into a digital format (e.g., a JPEG file) or may be operable to send the electrical signals to the computing device 808, and the computing device 808 may be operable to convert the electronic signals into the digital format (e.g., via software executing on the computing device 808).

In some embodiments, the physical media item converter 806 may include a videocassette recorder. The videocassette recorder may be operable to read the content stored on a videocassette and generate a plurality of electronic signals based on the read content. The videocassette recorder may include an output interface. The videocassette recorder may send the plurality of electrical signals to the output interface, and the output interface may send the plurality of signals to the computing device 808, e.g., via one or more audio/video cables connecting the videocassette recorder and the computing device 808. The computing device 808 may be operable to convert the electronic signals into a digital format (e.g. a Motion Picture Experts Group (MPEG) file or a MOV file). In some embodiments, the videocassette recorder may convert the electronic signals to the digital format, or the computing device 808 may be operable to perform the conversion.

In one or more embodiments, the physical media item converter 806 may include a film-to-video converter. The film-to-video converter may be operable to read the content stored on a film reel and generate a plurality of electronic signals based on the read content. The film-to-video converter may convert the electronic signals to a computer file (e.g., an MPEG file) or may propagate the electronic signals to the computing device 808 via an output interface of the film-to-video and one or more audio/visual cables, and the computing device 808 may be operable to perform the digital conversion.

In some embodiments, the physical media item converter 806 may include a tape cassette player. The tape cassette player may be operable to read content stored on an audio tape and generate a plurality of electronic signals based on the on the read content. The tape cassette player may be operable to convert the electronic signals into a digital format (e.g., an MP3 file), or the tape cassette may include an output interface, and the tape cassette player may send the plurality of electronic signals to the output interface. The output interface may send the plurality of electronic signals to the computing device 808 via one or more audio/visual cables, and the computing device 808 may be operable to perform the digital conversion.

In some embodiments, the physical media item converter 806 may include a computing device (such as the computing device 808). The computing device may be operable to read content stored on a device, such as a cellphone, camcorder, PDA or other type of device. The computing device may connect to the device via a cable (e.g., a universal serial bus (USB) cable or some other type of cable) in order to read or extract the content from the device. The content stored on the device may be in a digital format. The digital format may include a file format that may be uncommon, proprietary, or used in a foreign country. The computing device may be operable to extract the stored content from the device and store it on the computing device or a computer-readable storage in data connection with the computing device. The computing device may convert the extracted content and store the converted content in a more widely used digital format. In some embodiments, the content stored on the device may include recorded video, audio, or images. The content stored on the device may include text content, such as text messages, emails, text documents, notes, or other text content.

In one embodiment, the computing device 808 may include a desktop computer, a laptop computer, or a tablet computer. The computing device 808 may include an application server, a database server, or some other type of server. The computing device 808 may be in data or electronic communication with other devices—such as the printer 802, the barcode scanner 804, the physical media item converter 806, or another computing device—over a data network, such as a local area network or the Internet. The processor 810 may include a central processing unit (CPU), graphical processing unit (GPU), or some other type of processor. The processor 810 may include a single core or multiple cores. The computer-readable storage medium 812 may include non-volatile storage, such as a hard drive, or volatile storage, such as random access memory. Other examples and details of computing devices 808 and various components thereof are provided below.

In one embodiment, the one or more computer-executable instructions may include software executable by the computing device 808. The software may include one or more computer programs executable on the computing device 808. In some embodiments, portions of the software may execute on a device in data communication with the computing device 808.

In one embodiment, the software may be operable to receive a digitization order from the customer. The customer may access a webpage using a browser. The customer may enter information into the webpage based on the customer's desired order. For example, the customer may enter his/her name, address, and financial information. The customer may enter how many and what types of physical media items the customer wants digitized. The customer may enter whether he/she would like to receive the digitized content as a DVD, thumb drive, digital download, or another format. The customer may submit the digitization order to the computing device 808 from the webpage.

FIG. 9 depicts one embodiment of a portion of a database 900 for digitization orders. The database 900 may be stored on the computing device 808 or on a computing device separate from the computing device 808 but in data communication with the computing device 808. The database 900 may include one or more database entries 902. A database entry 902 may include one or more identifiers. An identifier may include a string of text. An identifier may help identify information with the database entry 902.

In one embodiment, a database entry 902 may include a customer order identifier 904 (abbreviated "Order ID" in FIG. 9). The customer order identifier 904 may include an identifier that corresponds to a customer's digitization order. In some embodiments, the customer order identifier 904 may match the order number of the customer's digitization order. Multiple database entries 902 that correspond to the same customer digitization order may include the same customer order identifier 904. For example, as can be seen in FIG. 9, the database entries 902(2)-(3) correspond to customer digitization order "933560," and database entries 902(4)-(6) correspond to customer digitization order "933561."

A database entry 902 may include a physical media item identifier 906 (abbreviated "Media ID" in FIG. 9). The physical media item identifier 906 may include an identifier that corresponds to a physical media item. In some embodiments, the physical media item identifier 906 may include the barcode data of a barcode 122. For example, as seen in FIG. 9, the database entries 902(4) includes a physical media item identifier 906 that matches the barcode data of the barcode 122 of the physical media item labels 402 of FIG. 4A. The physical media item identifier 906 may be formatted to be the customer digitization order number, followed by a dash, followed by a number that sequentially increased for each database entry 902, as can be seen in FIG. 9 at database entries 902(4)-(6).

In some embodiments, the physical media item identifier 906 may include an identifier other than barcode data, and a separate column in the database 900 may include the barcode data such that the physical media item identifier 906 corresponds to the barcode data for a certain database entry 902.

A database entry 902 may include a file identifier 908 (abbreviated "File ID" in FIG. 9). The file identifier 908 may include data that identifies a file, folder, or other data (herein generally referred to as a "file") that identifies the digitized content that corresponds to the database entry 902. The file identifier 908 may uniquely identify the file. For example, as shown in FIG. 9, the file identifier 908 may include the media item identifier 904 with the file format of the corresponding file appended. In some embodiments, the file identifier 908 may include a path to the file on the file system of the computing device 808.

In one or more embodiments, the computing device 808 generating a database entry 902 may include the computing device 902 generating the row in the database 900 for the database entry 902. Generating the database entry 902 may include including data in one or more fields of the database entry 902. Some of the fields of a database entry 902 may be blank or otherwise not have data, as can be seen in FIG. 9. For example, the file identifier 908 of the row 902(4) is blank.

In one embodiment, the computing device 808 may receive the customer's digitization order. The computing device 808 may generate one or more database entries 902 in the database 900 corresponding to the customer's digitization order. In some embodiments, the computing device 808 may generate one database entry 902 for each physical media item in the customer's order. For example, as shown in FIG. 9, if the customer's digitization order indicates that the customer has three physical media items to be converted, then the computing device 808 may generate three database entries 902(4)-(6). Generating a database entry 902 may include including, in the database entry 902, a customer order identifier 904 in the corresponding filed of the database entry 902.

In some embodiments, the computing device 808 may be operable to generate the plurality of barcodes 122. Each barcode 122 may be unique among all barcodes stored in the database 900. In some embodiments, the computing device 808 may store the barcode data of the plurality of generated barcodes 122 in the physical media item identifier 906 fields of the corresponding database entries 902. For example, as shown in FIG. 9, the computing device 808 may generate the barcode data "933561-01," "933561-02," and "933561-03" for the database entries 902(4)-(6) that correspond to the customer order with the customer order identifier "933561."

The computing device 808 may be operable to send the plurality of barcodes 122 to the printer 802. This may include the computing device 808 reading one or more physical media identifiers 906 from the database 900 where the database entries 906 include the same customer order identifier 902. For example, the computing device 808 may read the database to retrieve the database entries 902 that correspond to the customer digitization order 00345 (i.e., the database entries 902(4)-(6)). The computing device 808 may read the physical media identifiers 906 from these database entries 902(4)-(6) and send them to the printer 802. The printer 802 may print the booklet 100, and the booklet 100 may include the plurality of barcodes 122 on the barcode page 400, as is depicted in FIG. 4B. The booklet 100 may include the other pages and information discussed above.

In one embodiment, the booklet 100 may be sent to the customer. The printer 802 may print a shipping label with the customer's address (which the computing device 808 may have retrieved from the customer digitization order data submitted by the customer) and may be adhered to a box. The booklet 100 may be disposed inside the box so that the box and inserted booklet 100 form a package. The package may be sent to the customer.

The customer may receive the package, remove one or more labels 106 from the barcode page 400 of the booklet 100, and dispose the labels 106 on one or more of the customer's physical media items. The customer may dispose labels 106 from the upgrade page 500 on other physical media items. The customer may remove the label 106 from the shipping page 600 and dispose it on a box (either the box the booklet 100 was sent in or a different box). The customer may dispose the labeled physical media items inside the box along with the booklet 100. The customer may ship the box to the location indicated by the destination address 602 to be processed.

The barcode scanner 804 may scan a barcode 122 that is disposed on a physical media item from the package sent by the customer. The computing device 808 may be operable to receive, from the barcode scanner 804, a physical media item identifier 906. The physical media item identifier 906 may include the barcode data corresponding to the barcode 122 scanned by the barcode scanner 804. The computing device 808 may determine whether the received physical media item identifier 906 is stored within the database 900.

The computing device 808 may be operable to receive, from the physical media item converter 806, the content stored on a physical media item. The physical media item may include a physical media item from the box sent by the customer and that has a label 106 with a barcode 122 disposed on the physical media item. The computing device 808 may receive the content as the plurality of electronic signals and convert the received content to a digital format. In some embodiments, the computing device 808 may receive the content as digital content (e.g., as a file) because the physical media item converter 806 may have performed the digital conversion.

The computing device 808 may be operable to store the digitally formatted content in a file on the computer-readable storage medium 812. The computing device 808 may store the file in a file system of the computing device 812 or in some other storage system. In some embodiments, the computing device 808 may store the file on a separate computing device that is in data communication with the computing device 808. The file may include a file identifier 908.

In one embodiment, the file may include the digitized content of a single physical media item. For example, the physical media item may include a videocassette, and the file generated based on that videocassette may include an MPEG file. In some embodiments, the file may include the digitized content of multiple physical media items. For example, the physical media items may include multiple photographic prints, and the file generated based on those photographic prints may include a ZIP folder (or other archive file) that includes multiple JPEG files, and the computing device 808 may have generated each JPEG file based on one of the multiple photographic prints.

In some embodiments, the computing device 808 may be operable to store, in a database entry 902 of a database 900, the physical media item identifier 906 and the file identifier 908. The computing device 808 may store the physical media item identifier 906 and the file identifier 908 in the same database entry 902 to indicate that the file identified by the file identifier 908 corresponds to the physical media item labeled with the label 106 that includes the barcode 122 whose barcode data matches the physical media item identifier 906. For example, as shown in FIG. 9, the database entry 902(1) includes the physical media item identifier 906 "827375-11" and the file identifier 908 "435678.zip." This database entry 902(1) may indicate that the envelope containing photographic prints that includes the label 106 with the barcode 122 "827375-11" has been digitized, and that the ZIP folder identified with the file identifier 908 "435678.zip" contains the corresponding JPEG files that correspond to the photographic prints.

FIG. 10A depicts one embodiment of a physical media item-file index 1000. In one embodiment, the computing device 808 may be operable to generate the physical media item-file index 1000. The physical media item-file index 1000 may include a list of physical media item identifiers 906 and their corresponding file identifiers 908. The physical media item-file index 1000 may include all of the physical media item identifiers 906 and file identifiers 908 that belong to a single customer digitization order. In one embodiment, the computing device 808 may send the physical media item-file index 1000 to the printer 802, and the printer 802 may print the physical media item-file index 1000 on a sheet of paper. In some embodiments, the computing device may include the physical media item-file index 1000 in a file (e.g., a text file) that may be included on a DVD, thumb drive, or in a digital download folder accessible to the customer. The physical media item-file index 1000 allow a customer to determine which files the customer received back correspond to which labeled physical media items that the customer sent in to be digitized.

As depicted in FIG. 10A, the file identifier 908 may include a number appended to the customer digitization order number that increments for each physical media item. For example, the physical media item labeled with a label 106 that included the barcode 122 number "933563-04" may have been a bundle of four photographs. The files corresponding to these four photographs may have been named "933563-04.jpg," "933563-05.jpg," "933563-06.jpg," and "933563-07.jpg," as shown in FIG. 10A. In other embodiments, as depicted in FIG. 10B, the file identifiers 908 for the bundle of photographs may include an additional number that is appended to the physical media item identifier 906 and that increments for each photograph in the bundle. As shown in FIG. 10B, the files corresponding to these four photographs may have been named "933563-04-01.jpg," "933563-04-02.jpg," "933563-04-03.jpg," and "933563-04-04.jpg."

In one embodiment, the computing device 808 may determine whether all of the physical media items associated with a single customer digitization order have been digitized. The computing device 808 may not complete the customer digitization order in response to one or more physical media items from the customer digitization order not having been digitized. Completing the customer digitization order may include marking, in the computing device 808 (e.g., in the database 900 or a storage medium of the computing device 808), the customer digitization order as complete. Completing the customer digitization order may include repackaging the physical media items in the box, including the DVD or thumb drive in the box, or including the printed-out physical media item-file index 1000.

In one embodiment, the software of the computing device 808 may operate in a rescanning mode. The rescanning mode may include the software operating to determine whether all of the physical media items from a single customer digitization order have been digitized. The barcode scanner 804 may rescan the barcodes 122 of the labels 106 disposed on the physical media items that are part of a customer digitization order. In response to the barcode scanner 804 scanning a barcode 122 of a label 106 disposed on a physical media item that has not been digitized, the computing device 808 may prevent the completion of the customer digitization order. The computing device 808 may display a message indicating that the physical media item has not been digitized. The computing device 808 may determine that the physical media item has not been digitized by retrieving the database entry 902 with the physical media item identifier 906 that corresponds to the barcode 122 that was just scanned, and determining that the file identifier 908 of the database entry 902 is empty, contains null data, etc. In response to determining that the physical media item has not been digitized, the computing device 808 may display a prompt to have the physical media item digitized using the physical media item converter 806, as described above. The software may switch into a scanning mode so that the physical media item that was not previously digitized can be digitized and the file identifier 908 added to the database entry 902, as described above.

In response to the computing device 808 determining that all physical media items associated with a single customer digitization order have been digitized. The computing device 808 may complete the customer digitization order. The physical media items may be replaced into the box, the printed out physical media item-file index 1000 may be placed into the box, the DVD or thumb drive containing the files of the digitized content of the physical media items may be placed into the box, and the label 106 of the customer shipping page 700 may be disposed on the box. This package may then be shipped to the customer so that the customer receives back his/her physical media items, and so that the customer receives the DVD or thumb drive and physical media item-file index 1000. In some embodiments, in response to the customer digitization order requesting a digital download, the computing device 808 completing the customer digitization order may include the computing device 808 providing a digital download to the customer. In one embodiment, the digital download may include the digitized content being stored in a location where the customer may download the digital content to his or her own device. For example, the digitized content may be stored in cloud storage or some other type of computer storage. The location of the digitized content on the cloud storage or other storage may be accessible by the customer, and the digitized content may be downloadable by the customer's device. In one embodiment, the computing device 808 may provide a link to the location of the digitized content, for example, by sending the link in an email to the customer's email address. In some embodiments, the digitized content may be stored on the cloud storage or other type of computer storage for a limited amount of time. For example, the customer may have 30 days to download the digitized content. In one embodiment, the digitized content may be stored on the cloud storage or other type of computer storage for a longer or shorter amount of time.

In some embodiments, the data stored by the database 900 may be stored in one or more files of a file system instead of in a database. The file system may include similar functions to the functions of the database. For example, the file system may be operable to generate files or portions of files that store customer order identifiers 904, physical media item identifiers 906, or file identifiers 908. The file system may be operable to read data from these files or file portions. The file system may be operable to update the files or file portions. The file system may be operable to remove files or file portions.

Figure 11A:
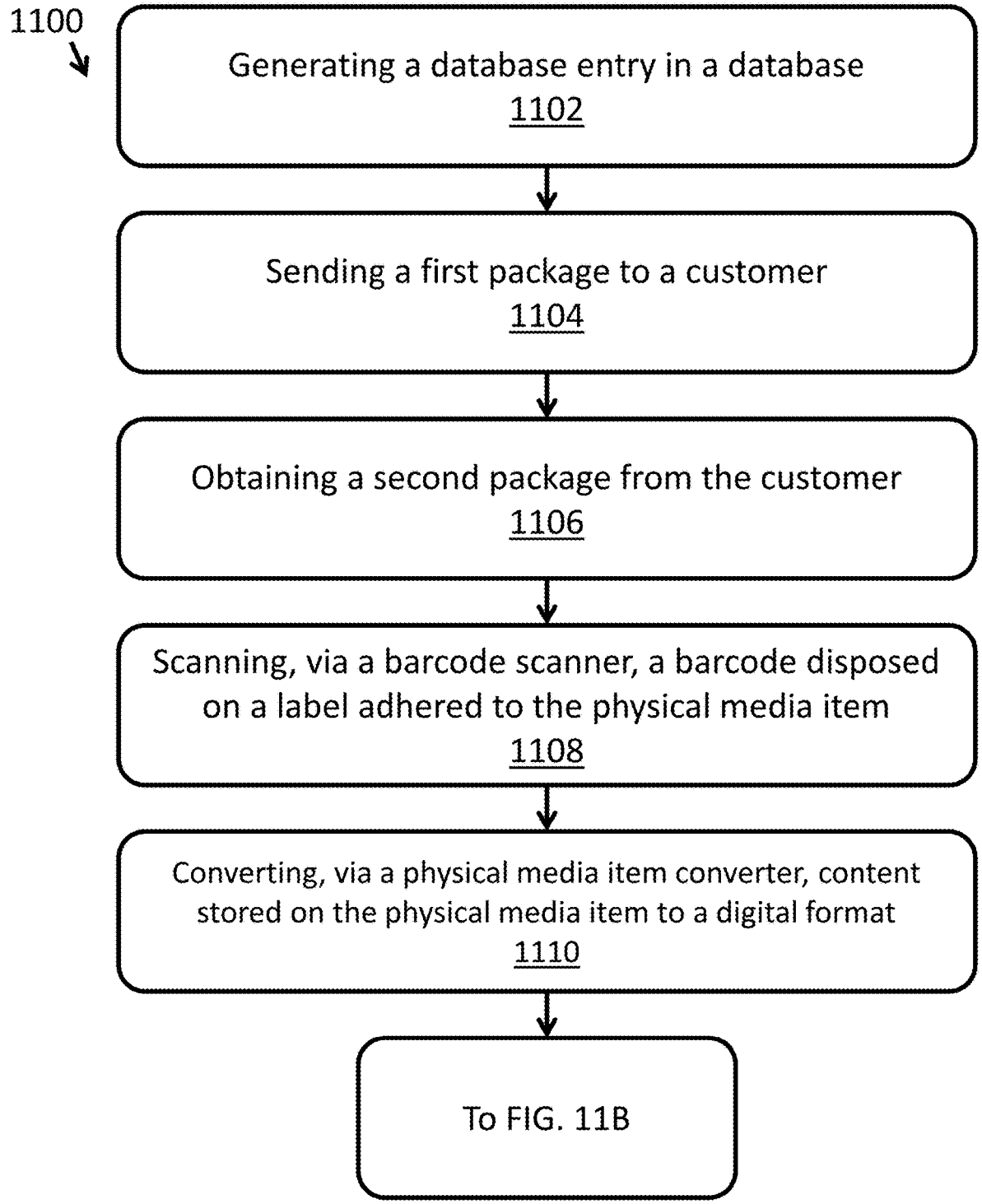
FIG. 11A is a flowchart diagram illustrating a portion of a method for converting physical media to digital media.
Figure 11B:
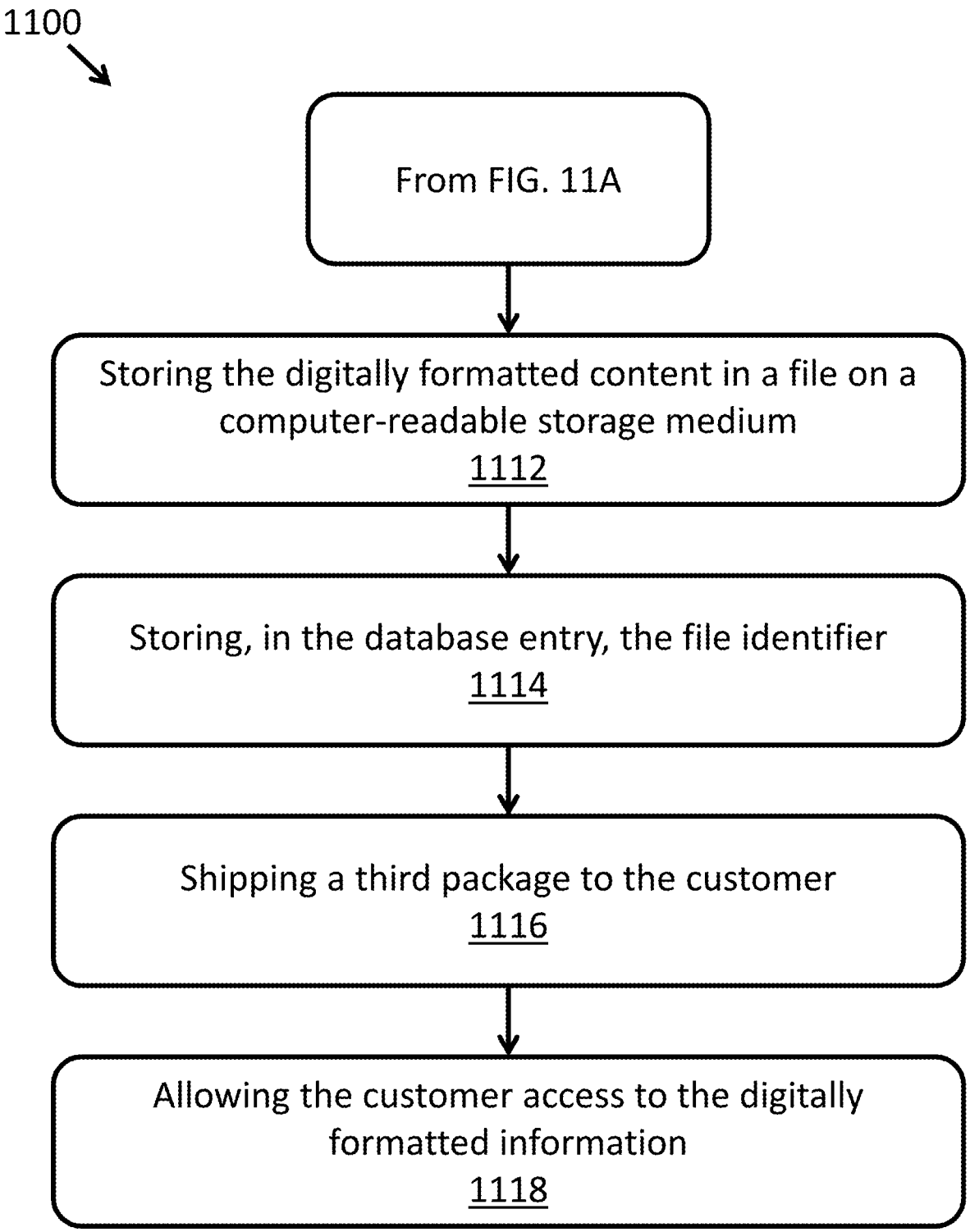
FIG. 11B is a flowchart diagram illustrating another portion of the method for converting physical media to digital media.

FIG. 11A and FIG. 11B depict one embodiment of a method 1100. The method 1100 may include a method of converting physical media to digital media. The method 1100 may include generating a database entry in a database (step 1102). The database entry may include a physical media item identifier. The method 1100 may include sending a first package to a customer. The method 1100 may include obtaining a second package from the customer (step 1106). The second package may include a physical media item. The method 1100 may include scanning, via a barcode scanner, a barcode disposed on a label adhered to the physical media item (step 1108). The barcode may correspond to the physical media item identifier of the database entry.

The method 1100 may include converting, via a physical media item converter, content stored on the physical media item to a digital format (step 1110). The method 1100 may include storing the digitally formatted content in a file of a computer-readable storage medium (step 1112). The file may include a file identifier. The method 1100 may include storing, in the database entry, the file identifier (step 1114). The method 1100 may include shipping a third package to the customer (step 1116). The second package may include the physical media item. The method 1100 may include allowing the customer access to the digitally formatted content (step 1118).

In one embodiment, the database may include the database 900 described above. The database entry may include a database entry 902 described above. Generating (step 1102) a database entry may be similar to the computing device 808 generating a database entry 902, as described above. The physical media item identifier may include the physical media item identifier 906 described above. Shipping (step 1104) the first package to the customer may include printing the booklet 100 based on the customer digitization order, disposing the booklet 100 inside a box, disposing a shipping label to the box, and shipping the box as the first package, as has been described above. Obtaining (step 1106) the second package from the customer may include receiving the package (including the physical media items and the booklet 100) shipped by the customer, as described above.

In some embodiments, the barcode scanner may include the barcode scanner 804. The barcode disposed on the label adhered to the physical media item may include a barcode 122 disposed on a label 106 and disposed on a physical media item as described above. The barcode corresponding to the physical media item identifier of the database entry may include the barcode data of the barcode 122 matching the physical media item identifier 906 of the database entry 902 (because, for example, the computing device 808 generated the barcode 122 based on the physical media item identifier 906 from the database entry 902, as described above). Scanning (step 1108) the barcode may include the barcode scanner 804 scanning the barcode 122 and sending the barcode data to the computing device 808, as described above.

In some embodiments, the physical media item converter may include the physical media item converter 806, described above. Converting (1110) the content stored on the physical media item to the digital format may include the physical media item converter 806 scanning or reading the content from the physical media item and generating the plurality of electronic signals, as described above. Then, either the physical media item converter 806 may convert the electronic signals into the digital format in the form of the file, or the physical media item converter 806 may send the electronic signals to the computing device 808, and the computing device 808 may convert the electronic signals into the file (step 1112), as described above.

In one or more embodiments, the digitally formatted content may include the file. The computer-readable storage medium may include the computer-readable storage medium 812, a different storage medium of the computing device 808, or a storage medium in data communication with the computing device 808, as described above. The file identifier may include the file identifier 908, as described above. The file identifier corresponding to the digitally formatted content may include the file identifier 908 identifying the file that stores the digitized content from the corresponding physical media item. Storing (step 1114) the file identifier may include storing the file identifier 908 in the corresponding database entry 902 of the database, as described above.

In some embodiments, shipping (1116) the third package to the customer may include shipping the box with the label from the customer shipping page 700 with the physical media items inside, as described above. Allowing (step 1118) the customer access to the digitally formatted content may include including, in the second package, a portable computer-readable storage medium. The portable computer-readable storage medium may include a DVD or a thumb drive. The portable readable-storage medium may include the digitally formatted content, such as the one or more files generated from the digitization process described above. Allowing the customer access to the digitally formatted content may include allowing the customer access to the digitally formatted content comprises providing the customer with a link to a downloadable location where the digitally formatted content is stored. This may include sending an email to the customer with a link to a digital download, as described above.

In some embodiments, the barcode corresponding to the physical media item identifier of the database entry may include the barcode 122 (or the barcode data of the barcode 122) matching the physical media item identifier 906 of the database entry 902, as described above. In one embodiment, the database 900 may include multiple database entries 902 (for example, as seen in FIG. 9). Each physical media item identifier 906 may be unique among all database entries 902 of the multiple database entries 902 of the database 900, as described above.

In one embodiment, the method 1100 may further include generating a physical media item-file index. The physical media item-file index may include the physical media item-file index 1000 described above. The physical media item-file index 1000 may include the physical media item identifier 906 and the corresponding file identifier 908. The computing device 808 may retrieve these identifiers 906, 908 from the database entries 902, as described above. In some embodiments, the second package may include a printed copy of the physical media item-file index 1000, as described above.

In some embodiments, the method 1100 may further include rescanning, via the barcode scanner, the barcode disposed on the label adhered to the physical media item. This may include the barcode scanner 804 rescanning the barcode 122 disposed on the label 106 disposed on a physical media item, as described above. The method 1100 may include determining whether the database entry that includes the physical media item identifier corresponding to the barcode includes a file identifier. For example, as described above, the computing device 808 may retrieve the database entry 902 that includes the physical media item identifier 906 received from the barcode scanner 804 and determine whether the database entry 902 includes the file identifier 908 or includes no data or null data instead. In response to the database entry 902 not including the file identifier 908, the computing device 808 may present a notification via a user interface of the computing device 808 or may prevent the completion of the customer digitization order, as described above.

In one embodiment, the booklet 100 may include a pre-printed booklet. A pre-printed booklet may include a booklet 100 that is not customized based on a customer digitization order. Instead, the booklet 100 may include one or more barcode pages 400 with pre-printed physical media item labels 402 or upgrade physical media item labels 408. The booklet 100 may include an upgrade page 500 with format upgrade labels 502. Different pre-printed booklets 100 may have different numbers of each type of label 402, 408, 502. For example, a first pre-printed booklet 100 may include a barcode page 400 with 10 pre-printed physical media item labels 402, and a second pre-printed booklet 100 may include a barcode page 400 with 20 pre-printed physical media item labels 402.

In some embodiments, the pre-printed booklet 100 may include an activation code. A customer may enter the activation code from the pre-printed booklet 100 and may enter his/her address into a webpage. The computing device 808 may receive the activation code and the address. The computing device 808 may look up the activation code in a database or other computer storage medium and determine information about the pre-printed booklet 100 (e.g., the customer order number, how many physical media item labels 402 the pre-printed booklet 100 includes, the digital format the physical media items will be returned in (e.g., DVD, digital download, etc.)). The computing device 808 may then generate database entries 902 based on the retrieved information. Copies of pre-printed booklets 100 may be sold in stores, on the Internet, on a home shopping channel, or another channel of commerce.

Figure 12A:
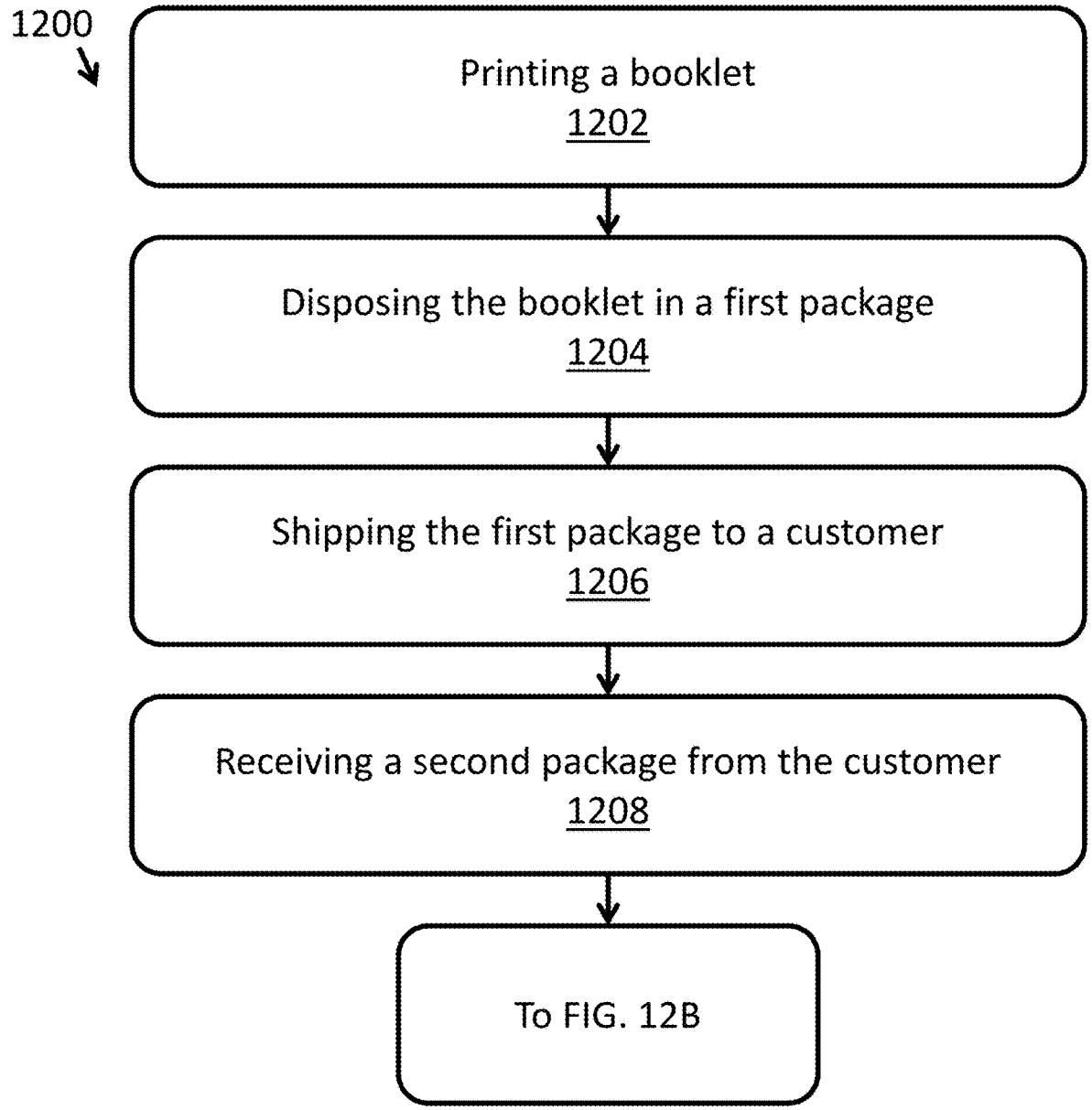
FIG. 12A is a flowchart diagram illustrating a portion of a method for improving an item.
Figure 12B:
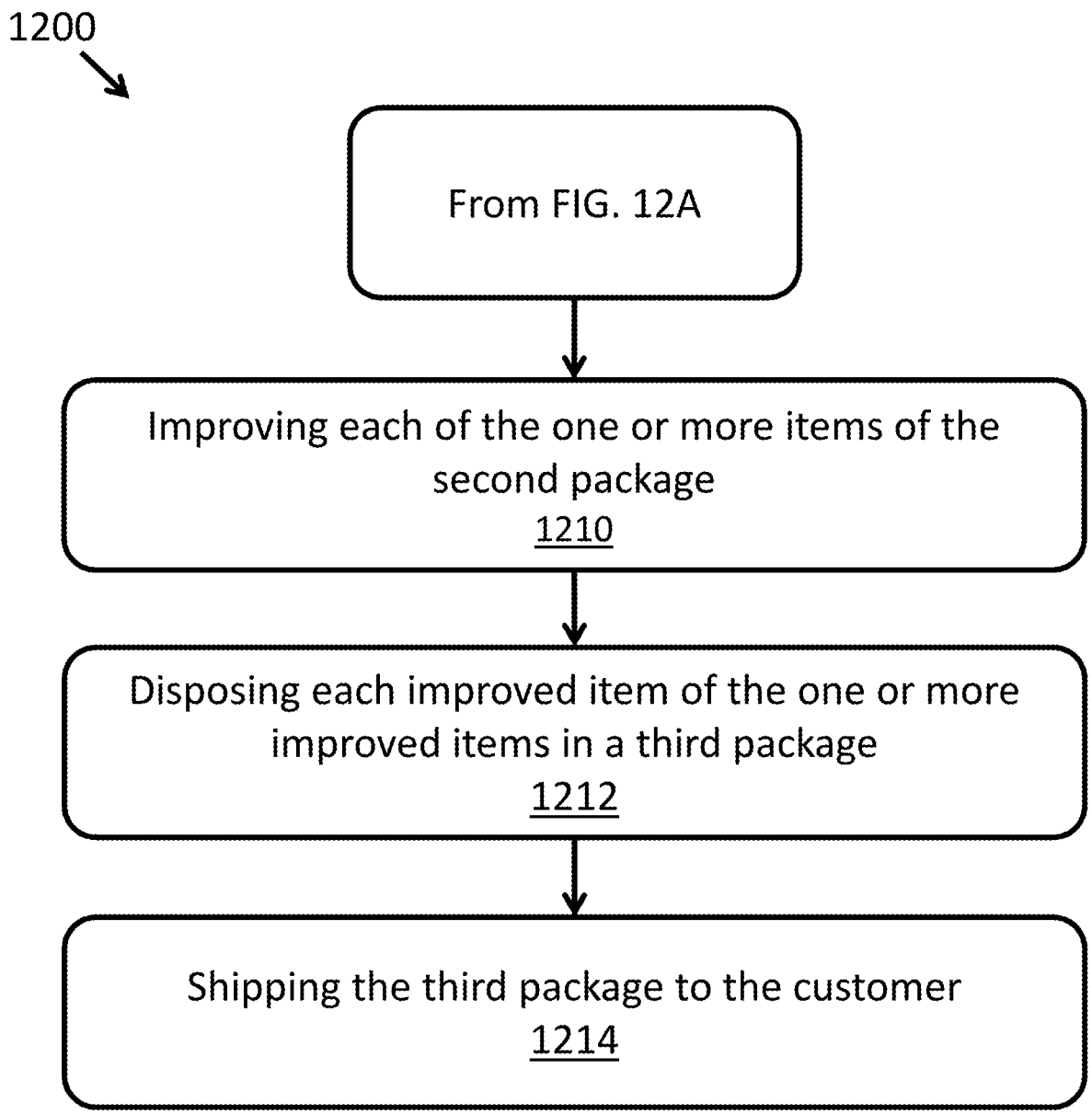
FIG. 12B is a flowchart diagram illustrating another portion of the method for improving an item.

FIG. 12A and FIG. 12B depict a method 1200. The method 1200 may include a method of adding value to an item. The method 1200 may include printing a booklet (step 1202). The booklet may include one or more labels. Each label of the one or more labels may include a barcode. The method 1200 may include disposing the booklet in a first package (step 1204). The method 1200 may include shipping the first package to a customer (step 1206). The method 1200 may include receiving a second package from the customer (step 1208). The second package may include one or more items. Each item of the one or more items may include a label of the one or more labels of the first package disposed on the item. The method 1200 may include improving each of the one or more items of the second package (step 1210). The method 1200 may include disposing each improved item of the one or more improved items in a third package (step 1212). The method 1200 may include shipping the third package to the customer (step 1214).

In one embodiment, the booklet, labels, and barcodes may be similar the booklet 100, the labels 106, or the barcodes 122. Printing the booklet (step 1202), disposing the booklet in the first package (step 1204), shipping the first package to the customer (step 1206), and receiving the second package from the customer (step 1208) may be similar to the similar steps of the method 1100 or other parts of the disclosure, disclosed above.

In some embodiments, the items of the second package may include a variety of types of items. An item may include a physical media item, a piece of clothing, an accessory (e.g., a purse), a piece of art, a piece of equipment (e.g. a tool), a weapon (e.g., a firearm or knife), or some other type of item. Improving an item (step 1210) may include refurbishing or adjusting the piece of clothing or the accessory, framing or restoring the piece of art, repairing the piece of equipment, repairing or refurbishing the weapon (e.g., cleaning the weapon, sharpening the knife, repairing the firearm, modifying the firearm, or adding an accessory to the firearm). In some embodiments, disposing each improved item of the one or more improved items in a third package (step 1212) or shipping the third package to the customer (step 1214) may be similar to the similar steps disclosed above regarding the method 1100 or disclosed elsewhere in this disclosure. In one embodiment, the method 1200 may include additional steps similar to those disclosed above, such as generating database entries, generating an item-improvement index, customizing the booklet based on customer order data, or other steps. A system similar to the system 800 may be used in connection with the method 1200.

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and may be covered by the claims.

Furthermore, the described features, structures, or characteristics of the disclosure may be combined in any suitable manner in one or more embodiments. In the description contained herein, numerous specific details are provided, such as examples of programming, software, user selections, hardware, hardware circuits, hardware chips, or the like, to provide understanding of embodiments of the disclosure. One skilled in the relevant art will recognize, however, that the disclosure may be practiced without one or more of the specific details, or with other methods, components, materials, and so forth. In other instances, well-known structures, materials, or operations may not be shown or described in detail to avoid obscuring aspects of the disclosure.

These features and advantages of the embodiments will become more fully apparent from the description and appended claims, or may be learned by the practice of embodiments as set forth herein. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable medium(s) having program code embodied thereon.

In some embodiments, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer-readable medium(s).

In some embodiments, a module may include a smart contract hosted on a blockchain. The functionality of the smart contract may be executed by a node (or peer) of the blockchain network. One or more inputs to the smart contract may be read or detected from one or more transactions stored on or referenced by the blockchain. The smart contract may output data based on the execution of the smart contract as one or more transactions to the blockchain. A smart contract may implement one or more methods or algorithms described herein.

The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium may include a portable computer diskette, a hard disk, a random access memory ("RAM"), a read-only memory ("ROM"), an erasable programmable read-only memory ("EPROM" or Flash memory), a static random access memory ("SRAM"), a hard disk drive ("HDD"), a solid state drive, a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations or block diagrams of methods, apparatuses, systems, algorithms, or computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present disclosure of a new and useful BARCODE BOOKLET, it is not intended that such references be construed as limitations upon the scope of this disclosure.

What is claimed is:

1. A booklet, comprising:
   a plurality of booklet pages, including
      a first multi-layer page, including
         a first label, including a front side and a back side, wherein the back side is disposed opposite the front side, and wherein the back side includes an adhesive, and
         a backing layer, wherein the back side of the first label is selectably adhered to the backing layer with the adhesive,
      a second multi-layer page, including a second label, and
      a single-layer page;
   a binding that joins the plurality of booklet pages; and
   a plurality of barcodes, wherein
      the first multi-layer page includes a barcode page,
      the first label includes a first plurality of labels, each label of the first plurality of labels including a barcode of the plurality of barcodes disposed on the front side of the first label,
      each barcode of the first plurality of barcodes is unique among the plurality of barcodes, and
      the second multi-layer page includes an upgrade page, wherein the second label includes a second plurality of labels, each label of the second plurality of labels including
         a barcode of the plurality of barcodes disposed on the first side of the second label, and
         upgrade information, wherein the upgrade information indicates a digital format for receiving digitized content.

2. The booklet of claim 1, wherein the digital format includes a digital download.

3. The booklet of claim 1, wherein:
   the multi-layer page includes a shipping page; and the label of the shipping page includes a printed shipping label.

4. The booklet of claim 1, wherein the binding includes a fastener.

5. The booklet of claim 1, wherein each label is selectably removable from the backing layer and selectably adhereable to a physical media item.

6. The booklet of claim 5, wherein the physical media item comprises at least one of:
   a tape cassette;
   a film reel; or
   a bundle of image items.

7. The booklet of claim 6, wherein an image item of the plurality of image items comprises at least one of:
   a photo print;
   a slide; or
   a film negative.

8. The booklet of claim 5, wherein the physical media item comprises at least one of:
   a DVD;
   a hard drive; or
   a disk insertable into a disk drive.

\* \* \* \* \*